(12) United States Patent
Fujisawa

(10) Patent No.: US 7,301,265 B2
(45) Date of Patent: Nov. 27, 2007

(54) LIGHT SOURCE UNIT, METHOD OF MANUFACTURING LIGHT SOURCE UNIT, AND PROJECTOR

(75) Inventor: Shohei Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 10/849,880

(22) Filed: May 21, 2004

(65) Prior Publication Data

US 2005/0023273 A1 Feb. 3, 2005

(30) Foreign Application Priority Data

May 22, 2003 (JP) ............................. 2003-145108
Sep. 12, 2003 (JP) ............................. 2003-321923

(51) Int. Cl.
*H01J 5/16* (2006.01)
*H01J 1/30* (2006.01)
*F21V 17/00* (2006.01)

(52) U.S. Cl. ...................... 313/113; 362/455; 362/328; 362/343

(58) Field of Classification Search ................ 362/455, 362/328, 343; 313/133
See application file for complete search history.

(56) References Cited

U.S. PATENT DOCUMENTS

| | | | | |
|---|---|---|---|---|
| 3,702,395 A * | 11/1972 | Rosendahl | ................. | 362/263 |
| 4,538,216 A * | 8/1985 | Mori et al. | ................. | 362/311 |
| 5,103,381 A * | 4/1992 | Uke | ........................... | 362/560 |
| 5,422,793 A * | 6/1995 | Kobayashi | ................... | 362/538 |
| 5,440,456 A * | 8/1995 | Bertling et al. | ............. | 362/520 |
| 6,086,231 A * | 7/2000 | Kenjo et al. | ................. | 362/507 |
| 6,161,953 A * | 12/2000 | Chouji et al. | ............... | 362/546 |
| 6,905,236 B2 * | 6/2005 | Nishizawa et al. | ......... | 362/539 |
| 2003/0007363 A1 * | 1/2003 | Yagi | ........................... | 362/510 |
| 2004/0021827 A1 * | 2/2004 | Sekiguchi et al. | ........... | 353/20 |
| 2004/0032744 A1 * | 2/2004 | Nishizawa et al. | ......... | 362/538 |

FOREIGN PATENT DOCUMENTS

| | | |
|---|---|---|
| JP | A 60-213916 | 10/1985 |
| JP | 03-266824 | 11/1991 |
| JP | 06-012901 | 1/1994 |
| JP | U 3002456 | 7/1994 |
| JP | A 10-199305 | 7/1998 |
| JP | 2000-028887 | 1/2000 |
| JP | WO 02/056110 A1 | 7/2002 |
| JP | 2003-019919 | 1/2003 |

* cited by examiner

*Primary Examiner*—Nimeshkumar D. Patel
*Assistant Examiner*—Peter Macchiarolo
(74) *Attorney, Agent, or Firm*—Oliff & Berridge, PLC

(57) ABSTRACT

Exemplary embodiments of the present invention include a light source unit in which only a small number of components are required, the shapes of the corresponding components are not complicated, a lens is fixed and hence good workability is achieved, and lowering of an illumination intensity of the light source unit while avoiding occurrence of displacement between an optical axis of an elliptic reflector integrated in the light source unit and an optical axis of a collimator lens is reduced or prevented.

7 Claims, 18 Drawing Sheets

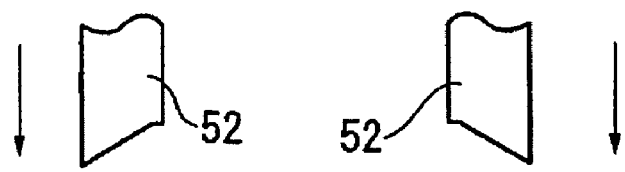
FIG. 5 (A)
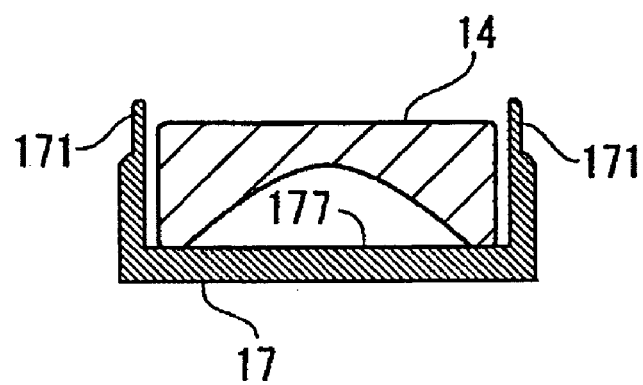
FIG. 5 (B)
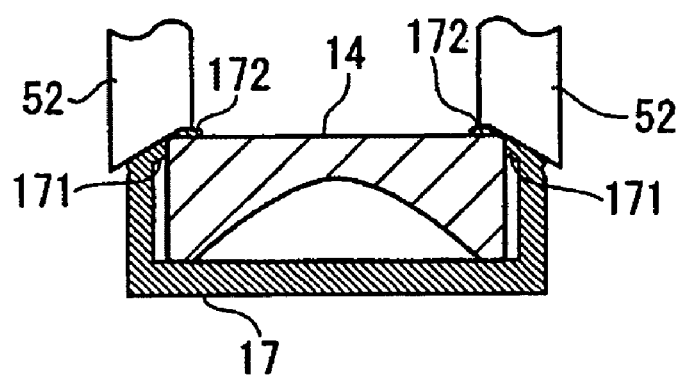

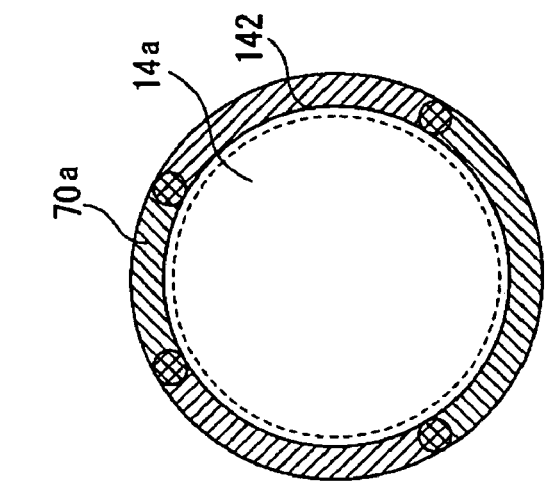
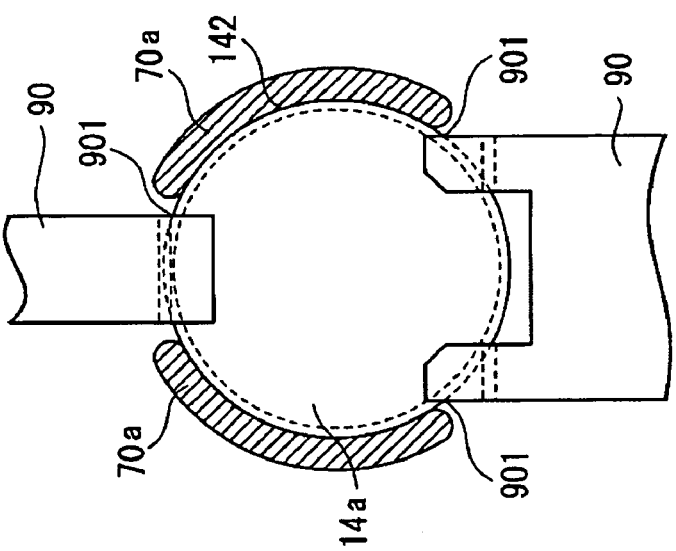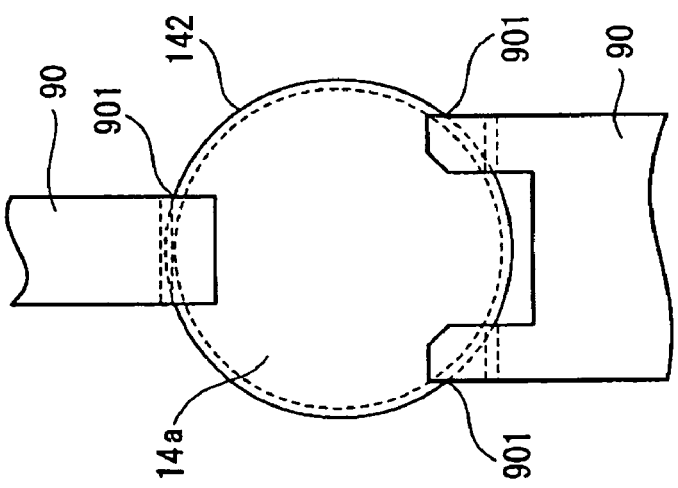

LIGHT SOURCE UNIT, METHOD OF MANUFACTURING LIGHT SOURCE UNIT, AND PROJECTOR

BACKGROUND

Exemplary embodiments of the present invention relate to a light source unit including: an arc tube having a light emitting section in which discharging emission between electrodes is carried out and sealed sections provided at both ends of the light emitting section; an elliptic reflector to emit a luminous flux radiated from the arc tube in a certain direction; a collimator lens to make parallel convergent light from the elliptic reflector, and a projector having the light source unit. The light source unit and the projector according to exemplary embodiments of the present invention can be used, for example, as the light source unit and the projector for multimedia presentation in conferences, academic conferences, exhibitions, and the like.

The related art includes a projector to enlarge and project an optical image by modulating a luminous flux emitted from a light source according to image information. Such a projector is used for presentation in conferences or the like with a personal computer. This type of related art project can be used to view movies on a large screen in a home theater.

The related art includes a light source unit to be used in this type of projector which has a structure including an electric discharging arc tube, such as a metal halide lamp or a high-pressure mercury lamp, and a collimator lens having an elliptic reflector stored in a lamp housing or the like to make parallel convergent light from the reflector.

On the other hand, fixation of the collimator lens to a lens frame with a higher degree of accuracy in the process of assembling the light source unit can enhance miniaturization and accuracy of the light source unit of the projectors. Therefore, it may be necessary to fix an optical axis of the collimator lens and an optical axis of the lens frame in alignment as much as possible, and to reduce or prevent lowering of an illumination intensity caused by displacement between the optical axis of the elliptic reflector and the optical axis of the collimator lens in order to enhance or improve the optical property of the light source unit.

A related art light source unit has a device to fix the collimator lens to the lens frame. This related art technology assembles the lens frame into the light source unit. A device to fix a lens to a lens frame, which is disclosed in related art document JP-A-2000-28887 claim 15, FIG. 1), is employed in assembly of a light source unit (optical lens unit). The lens is retained or fixed to the lens frame formed of thermoplastic resin.

The light source unit obtained from this technology includes a stationary holder to retain the lens frame in an unmovable state, a heating unit to receive heat for melting claws by coming into and out of contact with a heat generating unit, a movable member to be moved along the optical axis of the lens, forming units located at three positions to hold the edge of the lens surface of the lens and melting the claws so as to move toward the centerline of the optical axis of the lens, the forming units to form at substantially regular intervals on a heating surface, so that occurrence of displacement of the optical axis between the lens and the lens frame is reduced or prevented to satisfy required accuracies such as coaxiality of the lenses.

However, in the light source unit (optical lens unit) in the related art, since the device to fix the lens to the lens frame and then to the light source unit is complicated and the shapes of required components are also complicated, there arises such problem that the workability is low and hence the manufacturing cost increases. The light source unit in the related art is subject to another problem in that it is difficult to perform adjustment or fixation as described above for controlling displacement between the optical axes of the elliptic reflector and the collimator lens integrated therein, with high degree of accuracy.

SUMMARY

Exemplary embodiments of the present invention include a light source unit, in which a small number of components are required, the shapes of the components are not complicated, the lens can be fixed and hence the workability is good, displacement between the optical axes of the elliptic reflector and the collimator lens integrated therein is reduced or prevented and hence lowering the luminous efficiency of light emitted from an arc tube and lowering of the illumination intensity of the luminous flux emitting from the light source unit are reduced or prevented, and a projector employing such a light source unit.

A light source unit according to exemplary embodiments of the present invention includes an arc tube having a light emitting section in which discharging emission is performed between electrodes and sealed sections provided on both sides of the light emitting section, an elliptic reflector having an reflecting surface of a substantially oval shape to emit a luminous flux radiated from the arc tube in a certain direction, a collimator lens to make parallel convergent light from the elliptic reflector. Exemplary embodiments further include a lamp housing to set the direction of an optical axis of the elliptic reflector, the lamp housing including a lens positioning member in which the collimator lens is fixed, and is characterized in that the collimator lens is positioned and fixed with respect to the lamp housing by the lens positioning member in a state in which the optical axis of the elliptic reflector and an optical axis of the collimator lens are aligned.

According to the above-described configuration of exemplary embodiments of the present invention, since the collimator lens is positioned and fixed with respect to the lens positioning member provided in the lamp housing to set the direction of the optical axis of the elliptic reflector in a state in which the optical axis of the elliptic reflector and the optical axis of the collimator lens are aligned, displacement between the optical axis of the elliptic reflector and the optical axis of the lens is reduced or prevented, and a luminous flux emitted from the arc tube can be emitted efficiently from the light source unit, whereby the light source unit which can reduce or prevent lowering of the illumination intensity of illumination is addressed or achieved.

Also, good workability is addressed or achieved because only a small number of components are required, the shapes of the components are not complicated, and the lens can be simply fixed.

Preferably, in the light source unit according to exemplary embodiments of the present invention, the collimator lens is fixed to the lens positioning member by thermal caulking.

Preferably, in the light source unit according to exemplary embodiments the present invention, the lens positioning member is formed integrally with the lamp housing.

According to the above-described configuration of exemplary embodiments of the present invention, the number of components constituting the light source unit can be reduced, and problems such as complication of assembly and increase in manufacturing cost in association with increase in number of components may be reduced or avoided. Since the lens positioning member is formed integrally with the lamp housing, displacement between the optical axis of the elliptic reflector and the axis of the collimator lens can be reduced or prevented, and hence the luminous flux emitted from the arc tube can be emitted efficiently from the light source unit, thereby reducing or preventing lowering of the illumination intensity of the light source unit.

According to the above-described configuration of exemplary embodiments of the present invention, since a lens fixing member fixes the collimator lens by thermal caulking, backlash of the collimator lens with respect to the lens positioning member can be prevented, and consequently, displacement of the axis of the lens can be reduced or prevented, whereby the positioned collimator lens can be fixed with a high degree of accuracy. Therefore, the luminous flux emitted from the arc tube can be emitted further efficiently from the light source unit, whereby lowering of the illumination intensity of the light source unit can be reduced or prevented.

Preferably, in the light source unit according to exemplary embodiments of the present invention, the collimator lens is fixed to the positioning member with an adhesive agent.

According to the above-described configuration of exemplary embodiments of the present invention, since the collimator lens is fixed to the lens positioning member with the adhesive agent, backlash of the collimator lens with respect to the lens positioning member can be reduced or prevented as in the case of fixation by thermal caulking, and generation of clearance between the lens positioning member and the collimator lens can be restrained. Consequently, displacement of the axis of the lens can be reduced or prevented, and hence the positioned collimator lens can be fixed with high degree of accuracy. Therefore, the luminous flux emitted from the arc tube can be emitted further efficiently from the light source unit, and hence lowering of the illumination intensity of the light source unit can be reduced or prevented.

Also, exemplary embodiments of the present invention can be implemented even when material of the lens positioning member is material which cannot be used for thermal caulking, such as metal or ceramics, and hence it is the optimal means in case where the lens positioning member is formed of such material.

In addition, since the collimator lens can be fixed by a simple procedure, such as infusion of the adhesive agent and curing of the adhesive agent, manufacturing equipment or manufacturing process can be simplified.

Preferably, in the light source unit of exemplary embodiments of the present invention, the collimator lens is formed with a flange on the outer periphery thereof.

According to the above-described configuration of exemplary embodiments of the present invention, since the collimator lens is formed with a flange on the outer periphery thereof, the collimator lens can be retained easily for adjusting the position of the collimator lens. Also, when the collimator lens is fixed to the lens positioning member with the adhesive agent, infusion and application of the adhesive agent along the entire outer peripheral surface of the collimator lens can easily be performed. Therefore, the position of the collimator lens with respect to the lens positioning member can easily be adjusted, and the outer periphery of the collimator lens can be adhered and fixed easily.

Preferably, in the light source unit of exemplary embodiments of the present invention, the entire peripheral surface of the collimator lens is adhered and fixed to the lens positioning member.

According to the above-described configuration of exemplary embodiments of the present invention, since the entire outer peripheral surface of the collimator lens is adhered and fixed to the lens positioning member, the adhering portion is formed over the entire outer peripheral surface of the collimator lens, and hence the lens is fixed to the lens positioning member, fixing strength of the collimator lens with respect to the lens positioning member can further be enhanced or increased.

The explosion proof structure can be realized without unnecessarily increasing the number of components and the reliable explosion proof structure, in which fragments of the arc tube is reduced or prevented from flying out all directions even when the arc tube is blown out, is addressed or achieved.

Preferably, in the light source unit according to exemplary embodiments of the present invention, the angle of the extremity of the flange formed around the outer periphery of the collimator lens is an acute angle between 30° and 90°, and more specifically, between 30° and 60°.

According to the above-described configuration of exemplary embodiments of the present invention, since the angle of the extremity of the flange formed around the outer periphery of the collimator lens is an acute angle between 30° and 90°, for example, when the extremity of the flange of the collimator lens is mounted to a predetermined fixing jig to adjust the position of the collimator lens with respect to the lens positioning member, or when the collimator lens is fixed to the lens positioning member with adhesive agent, the claws formed on the fixing jig can retain the flange reliably, and hence the claws formed on the fixing jig are reduced or prevented from projecting from the inner surface of the flange. Therefore, even when the collimator lens is fitted to the positioning member in a state in which the collimator lens is mounted to the fixing jig and the adhesive agent is infused or applied, the inner surface of the fixing jig does not come into contact with the lens positioning member, and hence an adhering layer of the adhesive agent may be reduced or prevented; whereby displacement of the collimator lens due to curing and contraction of the adhesive agent can preferably be reduced or prevented.

A method of manufacturing a light source unit according to exemplary embodiments of the present invention is a method of manufacturing a light source unit including an arc tube having a light emitting section in which discharging emission is performed between electrodes and sealed sections provided on both sides of the light emitting section. Exemplary embodiments of the present invention further include an elliptic reflector having a reflecting surface of a substantially oval shape to emit a luminous flux radiated from the arc tube in a certain direction, a collimator lens to make parallel convergent light from the elliptic reflector, a lamp housing to set the direction of an optical axis of the elliptic reflector, and a lens positioning member provided in the lamp housing to fixedly accommodate the collimator lens. Exemplary embodiments further include fixing the elliptic reflector positioned with respect to the arc tube to the arc tube so that most part of light radiated from the arc tube is emitted from the elliptic reflector as convergent light converging toward a second focal point of the elliptic reflector, fixing the lamp housing fixed to the arc tube to the lamp housing, fitting the collimator lens to the lens positioning member, adjusting the position of the collimator lens with respect to the lens positioning member so that optimal distribution of the illumination intensity of the luminous flux, which is emitted from the arc tube, reflected by the elliptic reflector and parallelized by the collimator lens, is addressed or achieved, and fixing the collimator lens which is positioned with respect to the lens positioning member, to the lens positioning member.

According to the above-described configuration of exemplary embodiments of the present invention, since the position of the collimator lens can be adjusted and fixed with respect to the lens positioning member so that optimal distribution of the illumination intensity of the luminous flux emitted from the arc tube, reflected from the elliptic reflector, and parallelized by the collimator lens is addressed or achieved, the light source unit providing optimal distribution of the illumination intensity can be manufactured easily and reliably.

Preferably, in the method of manufacturing the light source unit according to exemplary embodiments of the present invention, the collimator lens is formed with a flange on the outer periphery thereof, the step of fitting the collimator lens into the lens positioning member is performed by allowing a grip device to grip the flange formed on the outer periphery of the collimator lens, mounting the collimator lens to the grip device, and fitting the collimator lens to the lens positioning member in a state in which the collimator lens is mounted to the grip device, and positioning the collimator lens with respect to the lens positioning member by moving the grip device. According to exemplary embodiments of the present invention, fixing the collimator lens to the lens positioning member is performed by adhering the outer peripheral portion of the collimator lens which is not gripped by the grip device to the lens positioning member with the adhesive agent; removing the grip device from the collimator lens, adhering the outer peripheral portion of the collimator lens at the positions between the outer peripheral portion of the collimator lens and the lens positioning member on which the adhesive agent with respect to the lens positioning member is not applied (the portion gripped by the grip device) and the lens positioning member with the adhesive agent, and adhering and fixing the entire surface of the outer peripheral portion of the collimator lens to the lens positioning member.

According to the above-described configuration of exemplary embodiments of the present invention, since the collimator lens can be positioned accurately with respect to the lens positioning member provided in the lamp housing in a state in which the collimator lens is mounted fixedly to the grip device which can grip the collimator lens, such as the fixing jig, positioning of the collimator lens can be performed easily and accurately. Also, since the entire outer peripheral surface of the collimator lens can be adhered and fixed to the lens positioning member easily and reliably, explosion proof structure can be realized more preferably.

Preferably, in the method of manufacturing the light source unit according to exemplary embodiments of the present invention, positioning of the collimator lens with respect to the lens positioning member is performed in the direction perpendicular to the direction of the optical axis of the collimator lens, and positioning of the collimator lens with respect to the lens positioning member is performed in the direction perpendicular to the direction of the optical axis of the collimator lens and in the direction of the optical axis.

According to the above-described configuration of exemplary embodiments of the present invention, since the positioning of the collimator lens with respect to the lens positioning member is performed in the direction perpendicular to the direction of the optical axis of the collimator lens, the optical axis of the elliptic reflector and the optical axis of the collimator lens can be aligned with higher degree of accuracy.

Furthermore, in addition to the positioning of the collimator lens in the direction perpendicular to the direction of the optical axis of the collimator lens, positioning of the collimator lens with respect to the lens positioning member is also preformed in the direction of the optical axis thereof, the optical axis of the elliptic reflector and the optical axis of the collimator lens can be aligned with higher degree of accuracy, and the convergent light emitted from the elliptic reflector can be guided into the collimator lens reliably. Therefore, the luminous flux emitted from the arc tube can be emitted efficiently from the light source unit, and the illumination intensity of the luminous flux emitted from the light source unit can be enhanced or improved.

A projector according to exemplary embodiments of the present invention is a projector to form an optical image to modulate a luminous flux emitted from a light source according to image information and to project an enlarged image, characterized in that the aforementioned light source unit is provided.

Another projector according to exemplary embodiments of the present invention is a projector to form an optical image to modulate a luminous flux emitted from a light source according to image information and to project an enlarged image, characterized in that the light source unit obtained by the method of manufacturing the aforementioned light source unit is provided.

According to the above-described configuration of exemplary embodiments of the present invention, the projector which has the same or similar operation and the effects as described above can be configured. Also, the light source unit in this configuration can be downsized easily and hence downsizing of the projector can be promoted.

BRIEF DESCRIPTION OF THE DRAWINGS

FIGS. 5(A) and (B) are schematics that show a procedure of thermal caulking according to the first exemplary embodiment of the present invention;

FIGS. 17(A)-(C) are schematics showing a procedure of adhesion of the collimator lens to the lens fixing member according to the fourth exemplary embodiment of the present invention;

DETAILED DESCRIPTION OF PREFERRED EMBODIMENTS

Figure 1:
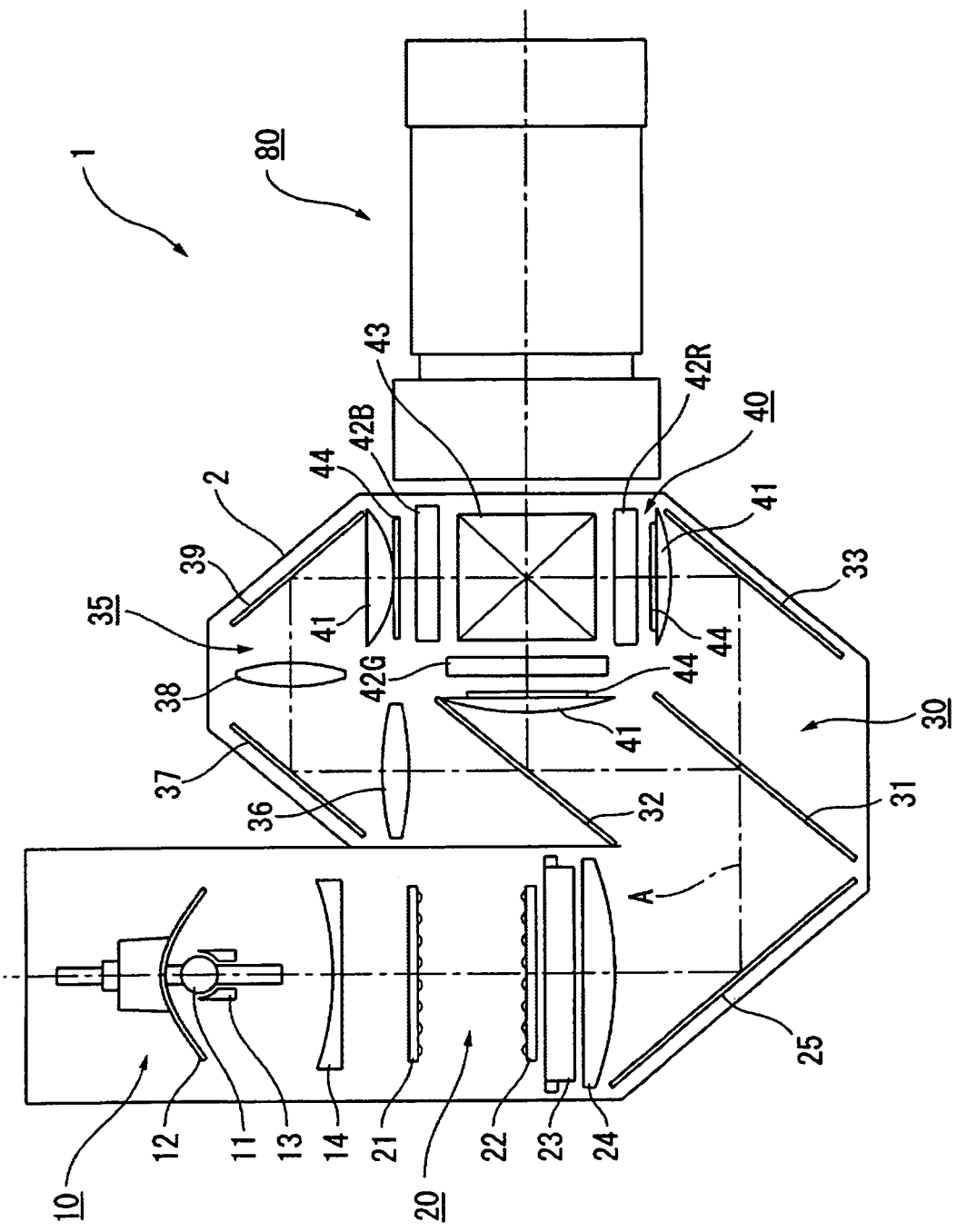
FIG. 1 is a schematic that shows a structure of an optical system of a projector according to an exemplary embodiment of the present invention.

Referring now to the drawings, exemplary embodiments of the present invention will be described.

FIG. 1 is a schematic showing an optical system of a projector 1 according to a first exemplary embodiment of the present invention. The projector 1 is an optical device to form an optical image by modulating a luminous flux emitted from a light source according to image information and projecting an enlarged image on a screen, and includes a light source lamp unit 10 as a light source unit, a uniformly illuminating optical system 20, a color separating optical system 30, a relay optical system 35, an optical instrument 40, and a projecting optical system 80. Optical elements constituting the optical systems 20-35 are positionally adjusted and stored in an optical component enclosure 2 having a preset reference axis A.

The light source lamp unit 10 emits a luminous flux radiated from a light source lamp 11 in a certain uniform direction to illuminate the optical device 40 and, though details are described later, includes the light source lamp 11, an elliptic reflector 12, a secondary reflecting mirror 13, and a collimator lens (collimator concave lens) 14.

The luminous flux radiated from the light source lamp 11 is emitted as convergent light via the elliptic reflector 12 uniformly toward the front, parallelized by the collimator lens 14, and emitted to the uniformly illuminating optical system 20.

The uniformly illuminating optical system 20 is an optical system to split the luminous flux emitted from the light source lamp unit 10 into a plurality of partial luminous fluxes to uniformize an illumination intensity in the surface of an illuminating area, and includes a first lens array 21, a second lens array 22, a polarized light converting element 23, and a superimposing lens 24, and a reflecting mirror 25.

The first lens array 21 has a function as a luminous flux splitting element to split the luminous flux emitted from the light source lamp 11 into a plurality of partial luminous fluxes, and includes a plurality of small lenses arranged in a matrix manner in a plane orthogonal to reference axis A. The contours of the respective small lenses are determined so as to be similar to the shapes of the image forming areas of liquid crystal panels 42R, 42G, 42B constituting the optical device 40, which will be described later.

The second lens array 22 is an optical element to converge the plurality of partial luminous fluxes split by the first lens array 21 described above together with the superimposing lens 24, and has a structure including a plurality of small lenses arranged in a matrix manner on a plane orthogonal to the reference axis A as in the case of the first lens array 21. However, since it is intended for convergence of light, the contour shapes of the respective small lenses are not required to have shapes corresponding to the image forming areas of the liquid crystal panels 42R, 42G, 42B.

The polarized light converting element 23 is a polarized light converting element to align the direction of polarization of the respective partial luminous fluxes split by the first lens array 21 in a certain uniform direction.

The polarized light converting element 23, not shown, has a structure in which polarized light splitting films and reflecting mirrors are arranged alternately and obliquely with respect to the reference axis A. The polarized light splitting film transmits one of P-polarized luminous flux and S-polarized luminous flux contained in the respective partial luminous fluxes, and reflects the other polarized luminous flux. The other polarized luminous flux, which is reflected, is redirected by the reflecting mirror, and is emitted in the direction of emission of one of the polarized luminous flux, that is, in the direction along the reference axis A. Some of the emitted polarized luminous fluxes are polarized and converted by a wave plate provided on a luminous flux emitting surface of the polarized light converting element 23, and all the polarized luminous fluxes are directed in the same direction. With such a polarized light converting element 23, since the polarized luminous fluxes emitted from the light source lamp 11 can be aligned into a polarized luminous flux proceeding in a certain uniform direction, the luminous efficiency of light from the light source used in the optical device 40 can be enhanced or improved.

The superimposing lens 24 is an optical element for converging the plurality of partial luminous fluxes passed through the first lens array 21, the second lens array 22, and the polarized light converting element 23 and superimposing them onto the image forming areas of the liquid crystal panels 42R, 42G, and 42B. Although the superimposing lens 24 in this example is a spherical lens having a flat end surface on the incoming side of the luminous flux transmitting area and a spherical end surface on the outgoing side thereof, an aspherical lens may also be employed.

The luminous flux emitted from the superimposing lens 24 is redirected on the reflecting mirror 25 and emitted toward the color separating optical system 30.

The color separating optical system 30 includes two dichroic mirrors 31, 32, and a reflecting mirror 33, and has a function to separate the plurality of partial luminous fluxes emitted from the uniformly illuminating optical system 20 into light in three colors of red (R), green (G), and blue (B) by the dichroic mirrors 31, 32.

The dichroic mirrors 31, 32 each are an optical element formed with a wavelength selecting film which reflects a luminous flux of a predetermined certain range of wavelength and transmits a luminous flux of other wavelength on a base plate. The dichroic mirror 31 to be disposed on the upstream of an optical path is a mirror which transmits red light and reflects light in other colors. The dichroic mirror 32 disposed on the downstream of the optical path is a mirror which reflects green light and transmits blue light.

The relay optical system 35 includes an incoming side lens 36, a relay lens 38, and reflecting mirrors 37, 39, and has a function to guide blue light passed through the dichroic mirror 32 constituting the color separating optical system 30 to the optical device 40. The reason why such a relay optical system 35 is provided in the optical path of blue light is, since the length of the optical path of blue light is longer than the optical paths for light in other colors, to reduce or prevent lowering of the luminous efficiency of light due to divergence of light. In this example, the configuration as described above is employed since the optical paths of blue light is long, the configuration in which the optical path of red light is long is also conceivable.

Red light separated from the dichroic mirror 31 is redirected by the reflecting mirror 33 and supplied to the optical device 40 via a field lens 41. Green light separated by the dichroic mirror 32 is supplied to the optical device 40 via the field lens 41 as is. Further, blue light is converged and redirected by the lenses 36, 38 which constitute the relay optical system 35 and the reflecting mirrors 37, 39 and supplied to the optical device 40 via the field lens 41. The field lens 41 provided on the upstream of the optical paths of light of the respective colors in the optical device 40 is provided to convert the respective partial luminous flux emitted from the second lens array 22 into a luminous flux parallel with the reference axis A.

The optical device 40 forms a color image by modulating the incoming luminous flux according to image information, and includes the liquid crystal panel 42 as optical modulating unit, which is object to be illuminated, and a cross dichroic prism 43 as a color synthesis optical system. An incoming side polarizing plate 44 is interposed between the field lens 41 and the respective liquid crystal panels 42R, 42G, 42B, and an outgoing side polarizing plate is interposed between the respective liquid crystal panels 42R, 42G, 42B and the cross dichroic prism 43, though not shown, whereby optical modulation of incoming light of the respective colors is performed by the incoming side polarizing plate 44, the liquid crystal panels 42R, 42G, 42B, and the outgoing side polarizing plate.

The liquid crystal panels 42R, 42G, 42B each are formed by hermetically encapsulating liquid crystal, which is an electro-optical substance, into a pair of transparent glass plates, and for example, modulate the polarizing direction of the polarized luminous flux emitted from the incoming side polarizing plate 44 according to supplied image signals with a polysilicon TFT as a switching element. The image forming areas for performing modulation of the liquid crystal panels 42R, 42G, 42B are rectangular, and have a diagonal size of 0.7 inches for example.

The cross dichroic prism 43 is an optical element to form a color image by synthesizing optical images which are modulated for each color of light emitted from the outgoing side polarizing plate. The cross dichroic prism 43 is formed by adhering four rectangular prisms and is square in plan view. On interfaces between the respective adjacent rectangular prisms, there are formed dielectric multi-layer films. One of dielectric multi-layer films of the substantially X-shape reflects red light, and the other dielectric multi-layer film reflects blue light. Red light and blue light are redirected by the dielectric multi-layer films and directed into the same direction as green light, so that three colors are synthesized.

Then, the color image emitted from the cross dichroic prism 43 is enlarged and projected by the projecting optical system 80 to form a big screen image on a screen, not shown.

[Detailed Description of Light Source Unit]

Figure 2:
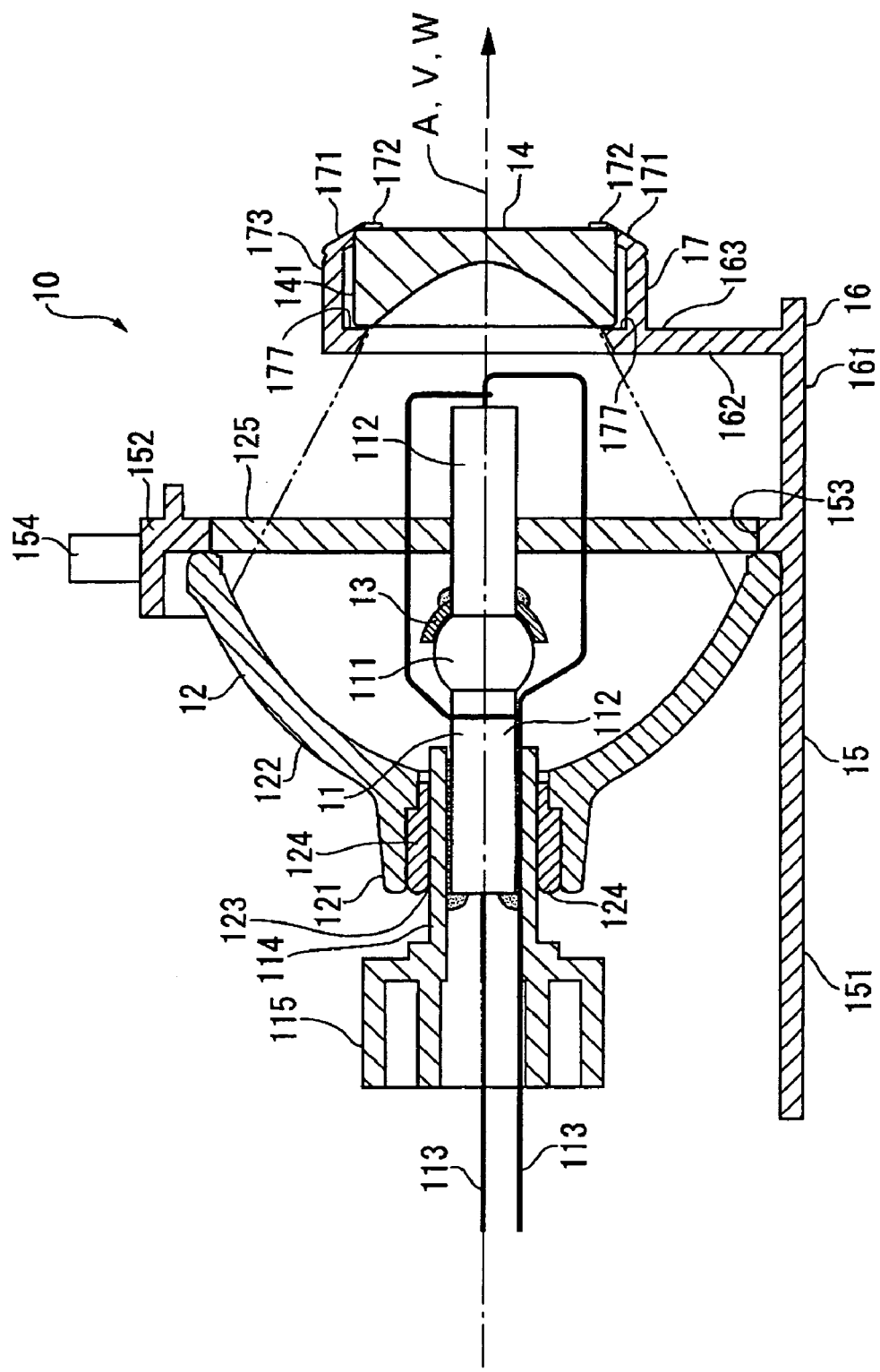
FIG. 2 is a schematic cross-sectional view showing a structure of a light source unit according to a first exemplary embodiment of the present invention.

The light source lamp unit 10 as the above-described light source unit includes a lens positioning member 16 having a lamp housing 15 and a lens fixing member 17 as shown in FIG. 2, in addition to the aforementioned light source lamp 11, the elliptic reflector 12, the secondary reflecting mirror 13 and the collimator lens (collimator concave lens) 14.

The light source lamp 11 as the arc tube is formed of a quartz glass tube swelling at the center into a spherical shape, and the center portion serves as a light emitting section 111, and the sections extending on both sides of the light emitting section 111 are designated as the sealed sections 112.

A pair of electrodes formed of tungsten to be disposed therein at a predetermined distance from each other, mercury, rare gas, and a small amount of halogen are encapsulated in the light emitting section 111, not shown in FIG. 2.

Molybdenum metallic foils to be electrically connected to the electrodes of the light emitting section 111 are respectively inserted into the sealed sections 112, and are sealed by glass material or the like. The metallic foils are connected to lead wires 113 as electrode leader lines, and the lead wires 113 extend to the outside of the light source lamp 11.

When a voltage is applied to the lead wires 113, an electric discharge occurs between the electrodes, and the light emitting section 111 emits light.

The elliptic reflector 12 is an integrally molded member formed of glass and provided with a neck portion 121 through which the sealed section 112 of the light source lamp 11 is inserted and a reflecting portion 122 in the form of an oval curved surface extending from the neck portion 121.

The neck portion 121 is formed with an insertion hole 123 at the center thereof, and the sealed section 112 is disposed at the center of the insertion hole 123 via a heat discharging portion 114 provided with an interposed section 124 and a fin 115.

The reflecting portion 122 is formed by depositing metallic thin film on the glass surface in the form of an oval curved surface, and the reflecting surface is formed into a cold mirror which reflects visual light and transmits infrared ray. A hermetically sealed portion 125 formed of glass or the like is disposed in the direction of the optical axis of the elliptic reflector 12 so that the elliptic reflector is hermetically closed.

Figure 3:
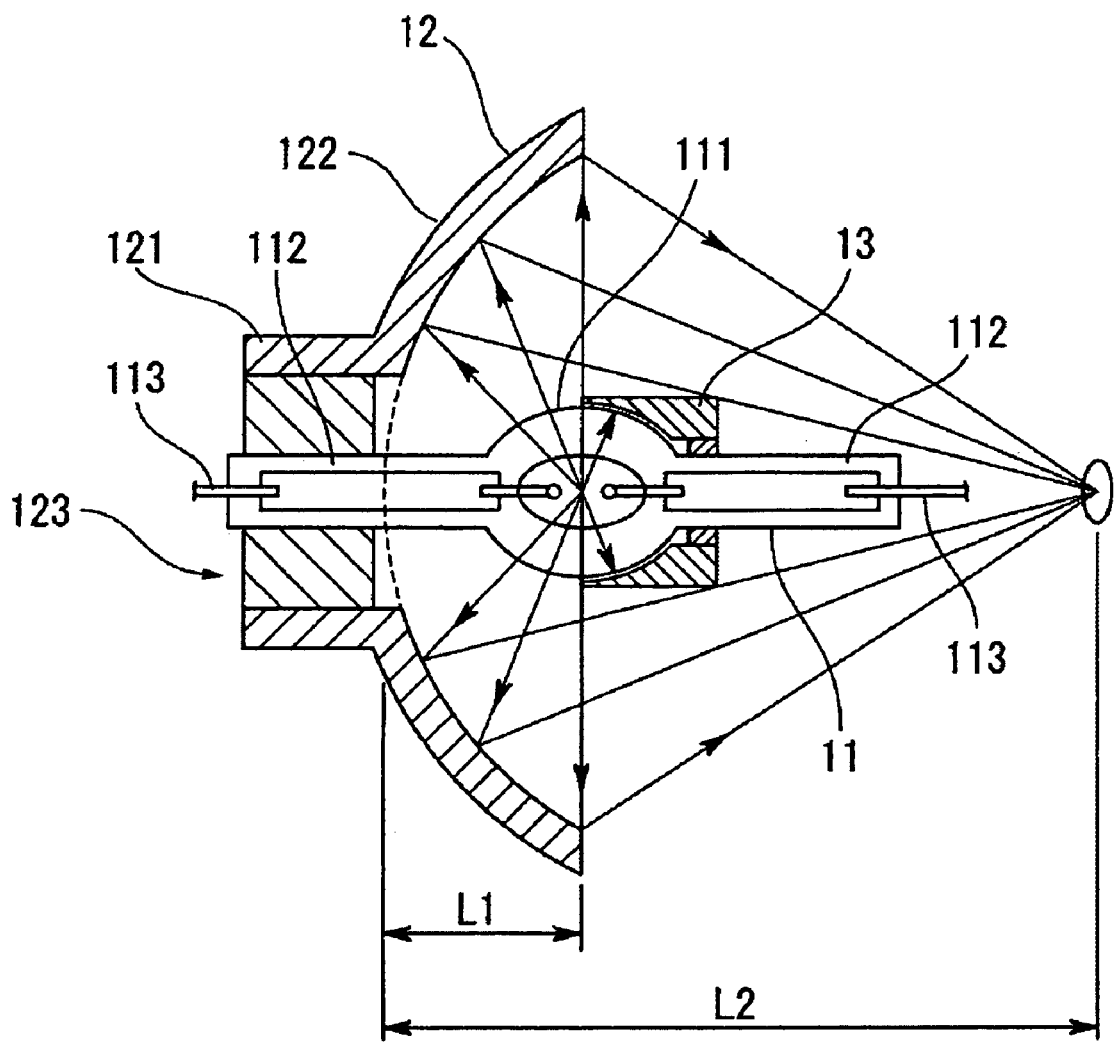
FIG. 3 is a schematic showing the operation of emission of a luminous flux of the light source unit according to the exemplary embodiment of the present invention.

As shown in FIG. 3, the light source lamp 11 is disposed in the reflecting portion 122, and is disposed so that the center of light emission between the electrodes in the light emitting section 111 matches a first focal point L1 of the oval curved surface of the reflecting portion 122.

Then, when the light source lamp 11 is illuminated, as shown in FIG. 3, the luminous flux radiated from the light emitting section 111 reflects on the reflecting surface of the reflecting portion 122, and converged into convergent light which converge at a second focal point L2 of an oval curved surface.

When fixing the light source lamp 11 to the elliptic reflector 12 as described above, as shown in FIG. 2, heat discharging portion 114 and the sealed section 112 of the light source lamp 11 are inserted into the insertion hole 123 of the elliptic reflector 12, so that the center of light emission between the electrodes in the light emitting section 111 matches the focal point of the oval curved surface of the reflecting portion 122, and an inorganic adhesive agent mainly containing silica/alumina is filled in the insertion hole 123 to form the interposed section 124. In this example, the lead wire 113 extending from the front sealed section 112 is also passed through the insertion hole 123 and exposed outside.

The dimension of the reflecting portion 122 in the direction of the optical axis is shorter than the length of the light source lamp 11. Therefore, when the light source lamp 11 is fixed to the elliptic reflector 12, the front sealed section 112 of the light source lamp 11 projects from a luminous flux emitting port of the elliptic reflector 12.

The secondary reflecting mirror 13 is a reflecting member to cover the substantially front half of the light emitting section 111 of the light source lamp 11, and though not shown in the drawing, the reflecting surface is formed into a concaved surface following the spherical surface of the light emitting section 111, and the reflecting surface is a cold mirror as in the case of the elliptic reflector 12.

By mounting the secondary reflecting mirror 13 to the light emitting section 111, as shown in FIG. 3, the luminous flux radiated toward the front of the light emitting section 111 is reflected by the secondary reflecting mirror 13 toward the light emitting section 111, and the luminous flux reflected by the secondary reflecting mirror 13 enters the elliptic reflector 12 and becomes a convergent light converging at the second focal point L2 of the elliptic reflector 12 by the reflecting portion 122 of the elliptic reflector 12.

With the secondary reflecting mirror 13, since the luminous flux which is eradiated toward the front of the light emitting section 111 in the direction of the optical axis but cannot directly enter the elliptic reflector 12 is reflected toward the reflecting portion 122 of the elliptic reflector 12 on the rear side in the direction of the optical axis by the secondary reflecting mirror 13, even when the oval curved surface on the front side of the reflecting portion 122 in the direction of the optical axis is small, most part of the luminous flux emitted from the light emitting section 111 can be emitted in a certain uniform direction as convergent light converging toward the second focal point of the elliptic reflector 12, whereby the dimension of the elliptic reflector 12 in the direction of the optical axis can be reduced.

The lamp housing 15 is an integrally molded member formed of synthetic resin into an L-shape in cross-section as shown in FIG. 2, and includes a horizontal portion 151 and the perpendicular portion 152.

The horizontal portion 151 is a portion which engages a wall of the optical component enclosure 2 for blocking the light source lamp unit 10 in the optical component enclosure 2 to reduce or prevent leakage of light. The horizontal portion 151 is formed with a terminal table for electrically connecting the light source lamp 11 with an external light source, though not shown, so that the lead wire 113 of the light source lamp 11 is connected to the terminal table.

The perpendicular portion 152 is a portion for positioning an optical axis V of the elliptic reflector 12 onto the predetermined reference axis A and positioning the elliptic reflector 12 in the direction of the optical axis. In this example, the distal portion of the elliptic reflector 12 on the side of the luminous flux emitting port is fixed to the perpendicular portion 152 with an adhesive agent or the like. The perpendicular portion 152 is formed with an opening 153 for allowing the luminous flux emitted from the elliptic reflector 12 to pass through.

The horizontal portion 151 and the perpendicular portion 152 as described above are formed with a projection 154. When the projection 154 engages the recess formed in the optical component enclosure 2, the optical axis V of the elliptic reflector 12 and the center of light emission of the light source lamp 11 are disposed on the reference axis A of the optical component enclosure 2.

The lens positioning member 16 is, as shown in FIG. 2, integrally formed with the lamp housing 15, and includes a parallel portion 161 extending from the horizontal portion 151 of the lamp housing 15, a perpendicular portion 162 formed perpendicularly with respect to the substantially distal end of the parallel portion 161, and the lens fixing member 17 formed at a distal end 163 of the perpendicular portion 162, and is a single piece member formed of synthetic resin together with the lamp housing 15.

The lens fixing member 17 formed on the lens positioning member 16 is formed of a cylindrical portion projecting from the distal portion 163 of the perpendicular portion 162 of the lens positioning member 16 described above, and the collimator lens 14 to make parallel the convergent light from the elliptic reflector 12 is fitted to the cylindrical portion. An optical axis W of the collimator lens 14 fixed to the fixing member 17 matches the extension of the optical axis V of the elliptic reflector 12.

As shown in FIG. 2, fixation of the collimator lens to the lens fixing member 17 in the present exemplary embodiment is addressed or achieved by setting the position of the light incoming side of the collimator lens 14 in the direction of the optical axis by a lens supporting surface 177 of the lens fixing member and fixing the light emitting side of the collimator lens 14 (the side indicated by an arrow in FIG. 2) by thermal caulking of the thermally caulked portions 171 formed on the light emitting side of the lens fixing member 17.

[Fixing device for Collimator Lens]

The structure of a fixing device 50 for fixing the collimator lens 14 to the lens positioning member 16 provided with the lens fixing member 17 will be described.

Figure 4:
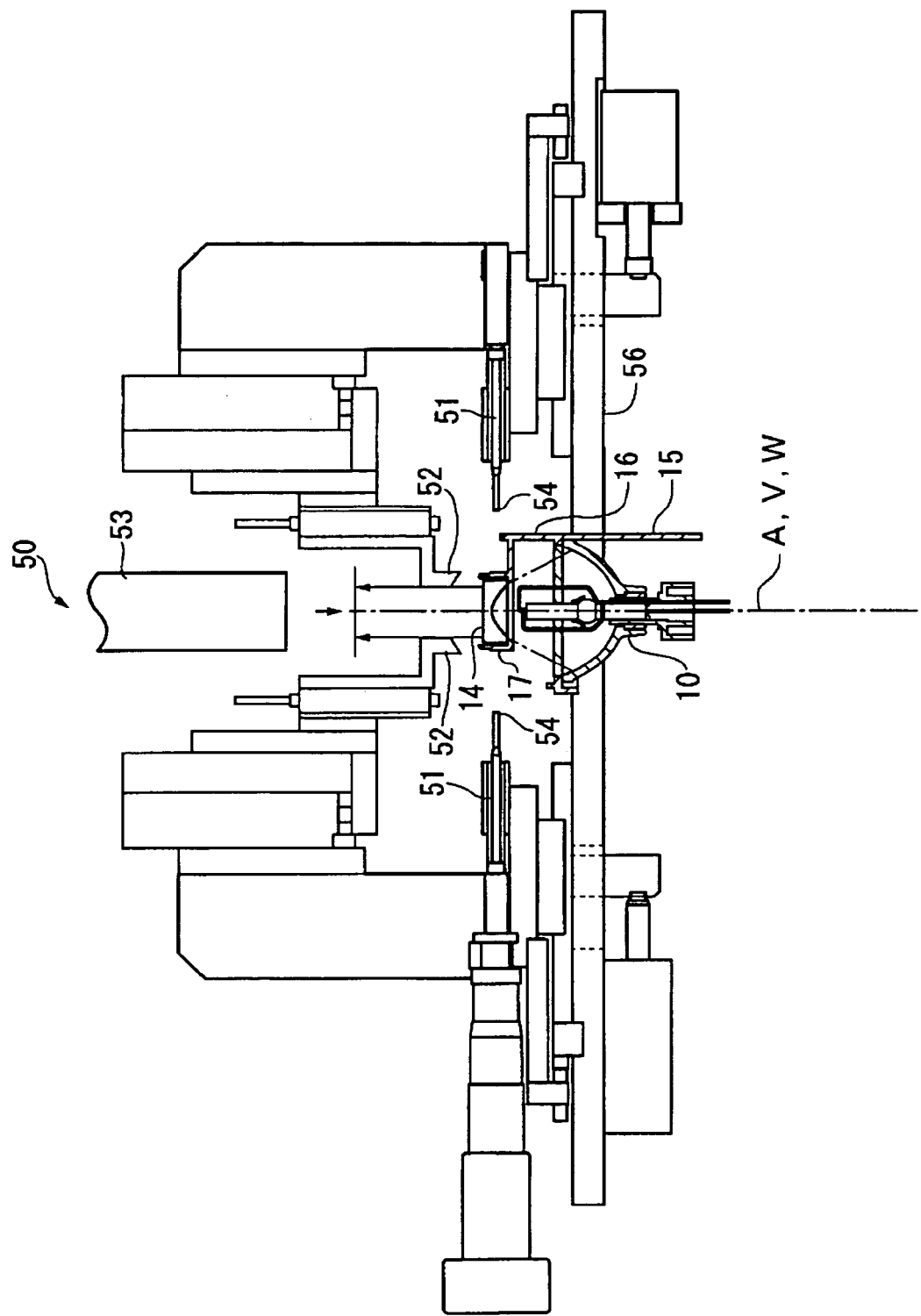
FIG. 4 is a schematic that shows a fixing unit for performing thermal caulking according to the first exemplary embodiment of the present invention.

The fixing device 50 shown in FIG. 4 mainly includes alignments 51 to position the collimator lens 14, thermal caulking devices 52, a retaining table 56 for retaining the lens positioning member 16 to which the collimator lens 14 is fixed, and a luminous flux detecting device 53 to detect the luminous flux emitted from the light source lamp unit 10 disposed in the fixing device 50.

As shown in FIG. 4, the alignments 51 are provided in the direction perpendicular to the optical axis of the collimator lens 14, and pins 54 disposed at the extremities thereof can be fine adjusted by an integrally provided air cylinder. By bringing the pins 54 into contact with the collimator lens 14 and allowing them to project and retract in the direction perpendicular to the optical axis, positioning of the collimator lens 14 in the direction perpendicular to the optical axis is addressed or achieved.

The thermal caulking devices 52 includes a heater integrated therein, and can fix the collimator lens 14 to the lens fixing member 17 by thermally caulking thermally caulked portions 171 with respect to the collimator lens 14 by moving downward and then heating and pressurizing the thermally caulked portions 171 of the lens fixing member 17.

The luminous flux detecting device 53 is disposed in the direction of the optical axis of the light source lamp unit 10 disposed in the fixing device 50 shown in FIG. 4, and is provided with a CCD (Charged-Coupled Device) camera for picking up the image of the luminous flux emitted from the light source lamp unit 10 disposed in the fixing device 50.

[Method of fixing Collimator Lens]

A method of manufacturing the light source lamp unit 10 including a method of fixing the collimator lens 14 with respect to the lens positioning member 16 provided with the lens fixing member 17 using the fixing device 50 will be described below.

(1-1) Fix the elliptic reflector 12 and the secondary reflecting mirror 13, which are positioned with respect to the light source lamp 11 so that most part of light emitted from the light source lamp 11 is emitted from the elliptic reflector 12 as the convergent light converged toward the second focal point of the elliptic reflector 12 to the light source lamp 11.

(1-2) Fix the elliptic reflector 12 provided with the light source lamp 11 and the secondary reflecting mirror 13 to the perpendicular portion 152 of the lamp housing 15.

(1-3) Dispose the lens positioning member 16 provided on the lamp housing 15 on the retaining table 56.

(1-4) Fit the collimator lens 14 to the lens fixing member 17 of the lens positioning member 16 so as to come into abutment with the lens supporting surface 177 of the lens positioning member 16.

(1-5) Illuminate the light source lamp 11, pick up the image of distribution of the illumination intensity of the luminous flux, which is radiated from the light emitting section 111, reflected on the elliptic reflector 12, and paralellized by the collimator lens 14, by the CCD camera of the luminous flux detecting device 53 disposed in the direction of the optical axis of the collimator lens 14 and convert the same into image data.

(1-6) Bring the pins 54 of the alignments 51 into contact with the collimator lens 14 according to information from the image data picked up by the CCD camera of the luminous flux detecting device 53, and finely move the collimator lens 14 and adjust the position thereof in the direction perpendicular to the optical axis of the collimator lens 14 so that the optimal distribution of the illumination intensity is addressed or achieved.

(1-7) When positioning of the collimator lens 14 in the direction perpendicular to the optical axis thereof is done, move the heat caulking device 52, which is positioned above the light source lamp unit 10 shown in FIG. 4 downward, thermally deform and contact-bond the thermally caulked portions 171, which are formed on the luminous flux emitting side of the collimator lens 14, by heating and pressurizing the same by the heaters integrated in the thermal caulking devices 52 at the lens fixing member 17, so that the extremities 172 of the thermally caulked portions 171 cover on the collimator lens 14 and are thermally caulked, whereby the collimator lens 14 is fixed to the lens fixing member 17.

FIG. 5 is a schematic that shows only the portion of the thermal caulking devices 52, which presses the thermally caulked portions 171 of the lens fixing member 17, in a state in which thermal caulking is performed by moving the thermal caulking device 52 downward, and heating and pressurizing by the same. The thermal caulking device 52 (only the portion which presses the thermally caulked portions 171 of the lens fixing member 17 is shown) is moved downward with respect to the lens fixing member 17 in which the collimator lens 14 is placed with the position thereof adjusted (FIG. 5(A)), and heats and pressurizes the thermally caulked portions 171 so that the extremities 172 of the thermally caulked portions 171 cover the collimator lens 14 to address or achieve thermal caulking (FIG. 5(B)), and the collimator lens 14 is fixed in a state of being adjusted in position with respect to the lens fixing member 17 of the lens positioning member 16 provided in the lamp housing 15.

The light source lamp unit 10 as described above is accommodated in the optical component enclosure 2 of the aforementioned projector 1.

According to the first exemplary embodiment described above, the following effects are achieved.

(A) Since the collimator lens 14 is fixed to the lens fixing member 17 of the lens positioning member 16 provided in the lamp housing 15, which includes the perpendicular portion 152 to position the elliptic reflector 12 in the direction of the optical axis, with the position adjusted, they are fixed with the optical axis V of the elliptic reflector 12 and the optical axis W of the collimator lens 14 aligned with each other, and hence displacement between the optical axis V of the elliptic reflector 12 and the optical axis W of the collimator lens 14 is reduced or prevented, whereby the light source lamp unit (light source unit) 10, in which lowering of the illumination intensity of the luminous flux emitted from the light source lamp unit 10 can be reduced or prevented, is provided.

Also, since the number of the required components is small, complication of the shapes of the corresponding components may be avoided, and the collimator lens 14 can be fixed with the simple means, good workability is addressed or achieved.

(B) Since the collimator lens 14 is fixed to the lens fixing member 17 by thermal caulking, strong fixation of the collimator lens 14 is addressed or achieved, and hence backlash of the collimator lens 14 with respect to the lens fixing member 17 is reduced or restrained. Consequently, displacement between the optical axis V of the elliptic reflector 12 and the axis of the collimator lens 14 can hardly occur, and hence fixation of the collimator lens 14 can be maintained with high degree of accuracy, whereby lowering of the illumination intensity of the luminous flux from the light source lamp unit 10 which emits the luminous flux of high illumination intensity can be reduced or prevented.

(C) Since the position of the collimator lens 14 in the direction of the optical axis is defined by the supporting surface 177 of the lens fixing member 17 and the position of the collimator lens 14 in the direction perpendicular to the optical axis thereof is adjusted by the alignments 51, alignment between the optical axis V of the elliptic reflector 12 and the optical axis W of the collimator lens 14 can be addressed or achieved with higher degree of accuracy.

(D) Since fixation of the collimator lens 14 is performed by a simple operation such that the thermally caulked portions 171 are provided on the lens fixing member 17, and the thermally caulked portions 171 are heated and contact-bonded by being thermally caulked to the collimator lens 14 by the thermal caulking device 52, the number of required components is small and complication of the shapes of the corresponding components may be avoided. In addition, since the collimator lens 14 can be simply fixed, the manufacturing facility or the manufacturing process can also be simplified, whereby good workability is addressed or achieved.

(E) Since the lens positioning member 16 is integrally formed with the lamp housing 15, the number of components constituting the light source lamp unit (light source unit) 10 can be reduced, and hence problems such as complication of assembly or increase in manufacturing cost in association with increase in number of components may be reduced or avoided. Since the lens positioning member 16 is integrally formed with the lamp housing 15, displacement between the optical axis V of the elliptic reflector 12 and the axis of the collimator lens 14 can hardly be occurred, whereby lowering of the illumination intensity of the light source lamp unit 10 is reduced or prevented.

(F) Since information on distribution of the illumination intensity of the luminous flux parallelized by the collimator lens 14 is detected by the luminous flux detecting device 53, and the position of the collimator lens 14 with respect to the lens fixing member 17 of the lens positioning member 16 is adjusted so that optimal distribution of the illumination intensity of the luminous flux parallelized by the collimator lens 14 is addressed or achieved, the light source lamp unit 10 for emitting the luminous flux in optimal distribution of the illumination intensity can be manufactured.

(G) The projector 1 in which the operation and effects as in (A) to (F) described above are achieved can be configured by employing the light source lamp unit 10 in the projector 1, brightness of projected images can be enhanced or improved, and hence reliability of the projector 1 can be enhanced or improved. Since the portion of the light source can be downsized by employing the light source lamp unit 10 provided with the secondary reflecting mirror 13 and hence downsized in the projector 1, the respective optical components can also be downsized, whereby the entire projector 1 can be downsized.

Second Exemplary Embodiment

Subsequently, a second exemplary embodiment of the present invention will be described. In the following description, parts which are similar to the parts or the members which have been already described are represented by the same reference numerals and descriptions thereof are omitted.

The light source lamp unit 10 according to the first exemplary embodiment described above is an integral molding of the lamp housing 15 and the lens positioning member 16 formed entirely of synthetic resin.

Figure 6:
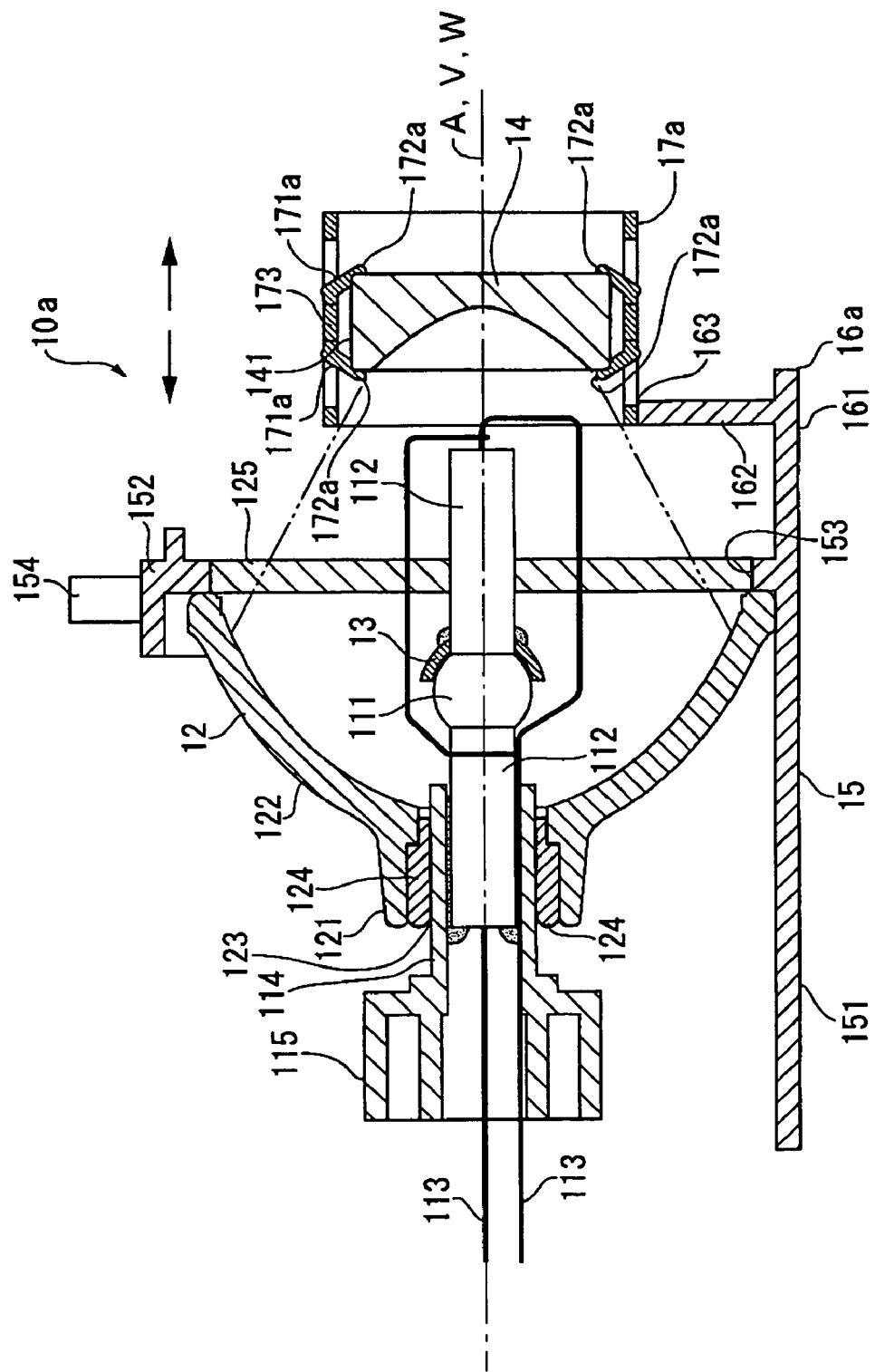
FIG. 6 is a schematic cross-sectional view showing the structure of the light source unit according to a second exemplary embodiment of the present invention.

In contrast, FIG. 6 shows a schematic cross-sectional view of a light source lamp unit 10a according to the second exemplary embodiment. The light source lamp unit 10a is different in that it includes a lens fixing member 17a, which is a cylindrical member, is formed so as to continue from the extremity 163 of the perpendicular portion 162 of a lens positioning member 16a, and the luminous flux emitting side and the luminous flux incoming side of the collimator lens 14 are thermally caulked by thermally caulked portions 171a formed on the lens fixing member 17a. The lens fixing member 17a formed of the cylindrical member can be molded integrally with the lens positioning member 16a.

Figure 7A:
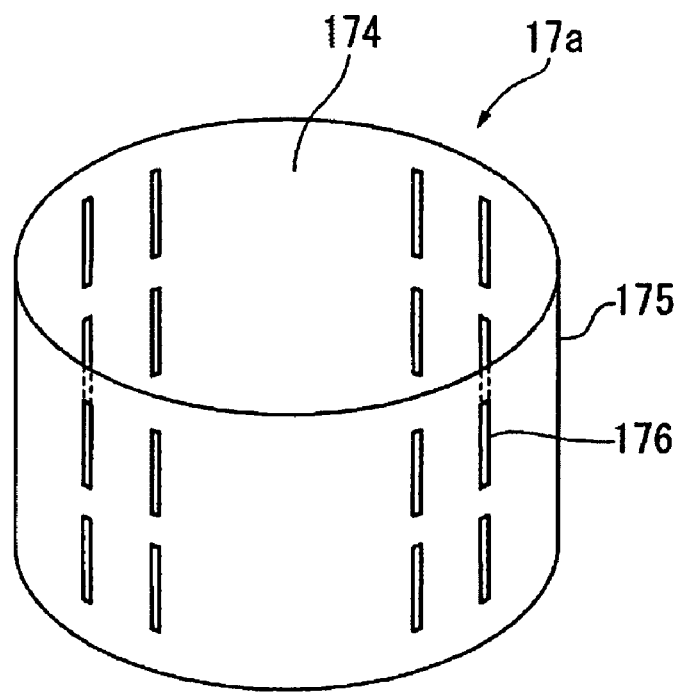
FIGS. 7(A) and (B) are schematics showing a lens fixing member constituting the second exemplary embodiment of the present invention.
Figure 7B:
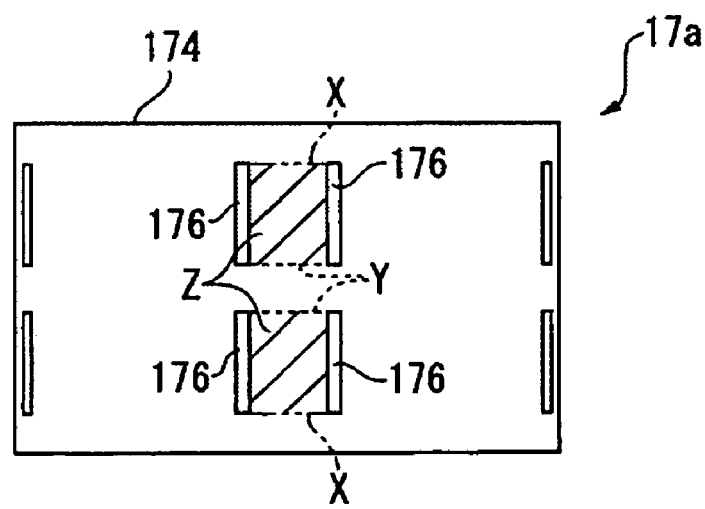

FIG. 7 is a schematic that shows the lens fixing member 17a of the present exemplary embodiment (FIG. 7(A) is a schematic perspective view, and FIG. 7(B) is a schematic view).

The lens fixing member 17a in the present exemplary embodiment is formed of a cylindrical member, and is formed with elongated rectangular holes 176 on a side surface thereof 175. The holes 176 are provided four in one set including two each in two rows at four positions in total at every 90 degrees with respect to the center of an opening 174 of the lens fixing member 17a. The set of four holes 176 can be provided at two positions, three positions, or five or more positions.

In the case of performing thermal caulking, X portions in FIG. 7(B) is cut, and Z portions are moved inwardly of the lens fixing member 17a along Y portions as a bending fulcrum, so that the thermally caulked portions 171a are formed.

Figure 8:
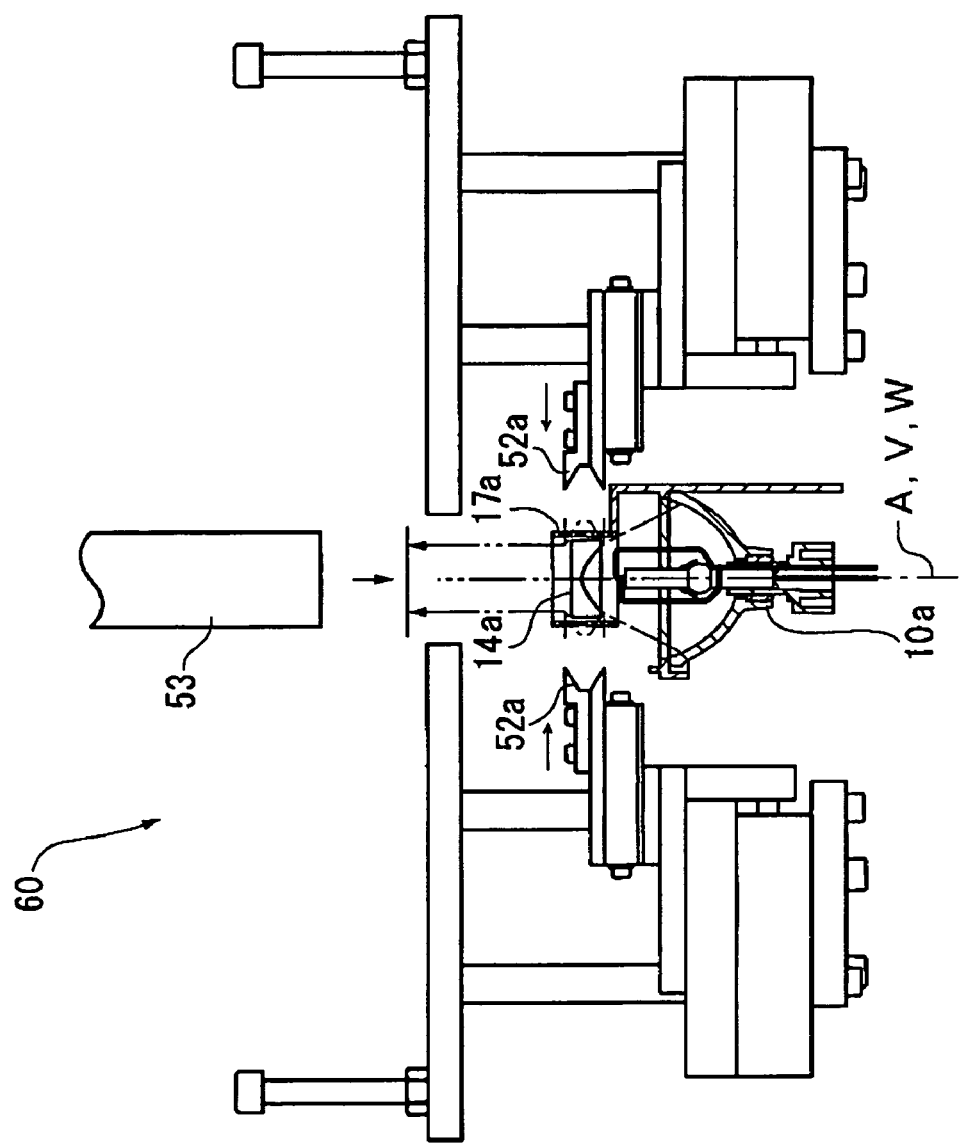
FIG. 8 is a schematic showing a fixing unit for performing thermal caulking according to the second exemplary embodiment of the present invention.

Referring now to FIG. 8, a fixing device 60 for fixing the collimator lens 14 to the lens positioning member 16a provided with the lens fixing member 17a will be described.

The fixing device 60 mainly includes thermal caulking devices 52a, alignments (not shown) for positioning the collimator lens 14, and the retaining table 56 (not shown) for retaining the lens positioning member 16a to which the collimator lens 14 is fixed as in the case of the fixing device 50 shown in FIG. 4. Also, the CCD camera of the luminous flux detecting device 53 is provided in the direction of the optical axis of the collimator lens 14 of the light source lamp unit 10a also as in the case of the fixing device 50 shown in FIG. 4.

In the present exemplary embodiment, as shown in FIG. 8, the thermal caulking devices 52a are provided on the left and right sides of the lens fixing member 17a. The thermal caulking devices 52a in a heated state approach from the left and right in the direction indicated by arrows in the drawing, respectively, to heat and presses the lens fixing member 17a from the side surface.

Although not shown in the drawing, alignments in the present exemplary embodiment are formed at four positions at every 90 degrees with respect to the center of the lens fixing member 17a, and pins provided at the extremities can be adjusted by air cylinders integrated therein. By bringing the pins into contact with the collimator lens 14 via the holes formed on the lens fixing member 17a and allowing them to project and retract with respect, positioning of the collimator lens 14 in the direction perpendicular to the direction of the light source, and in the direction of the light source is addressed or achieved.

Subsequently, a method of manufacturing the light source lamp unit 10a including a method of fixing the collimator lens 14 to the lens positioning member 16a provided with the lens fixing member 17a with the fixing device 60 in FIG. 8 will be described.

(2-1) As in the case of (1-1)-(1-3) of the method of fixing the collimator lens 14 with respect to the lens positioning member 16 according to the first exemplary embodiment described above, fix the elliptic reflector 12 positioned and fixed to the light source lamp 11 to the lamp housing 15 together with the secondary reflecting mirror 13, and dispose the lens positioning member 16a provided with the lamp housing 15 on the retaining table.

(2-2) Bring the pins provided at the extremities of the alignments into abutment with the collimator lens 14 so that the collimator lens 14 is placed within the lens fixing member 17a and retain the same.

(2-3) Illuminate the light source lamp 11 and pick up the image of distribution of the illumination intensity of the luminous flux radiated from the light emitting section 111, reflected by the elliptic reflector 12, and parallelized by the collimator lens 14 by the CCD camera of the luminous flux detecting device 53 and convert the same into image data.

(2-4) Finely move the pins (not shown) of the alignments with respect to the collimator lens 14 according to information on the image data picked up by the CCD camera of the luminous flux detecting device 53, and adjust the position of the collimator lens 14 in the direction perpendicular to the optical axis and in the direction of the optical axis of the collimator lens 14 so as to address or achieve the optimal distribution of the illumination intensity.

(2-5) When positioning of the collimator lens 14 in the direction perpendicular to the optical axis and in the direction of the optical axis is done, move the thermal caulking devices 52a located on the left and right sides of the lens fixing member 17a thereto, and fix the collimator lens 14 to the lens fixing member 17a by utilizing the Z portions shown in FIG. 7 as the thermally caulked portions 171a on the luminous flux emitting side and on the luminous flux incoming side of the collimator lens 14 and covering the extremities of the Z portions in the same drawing as distal end portions 172a over the collimator lens 14 to address or achieve thermal caulking.

Figure 9:
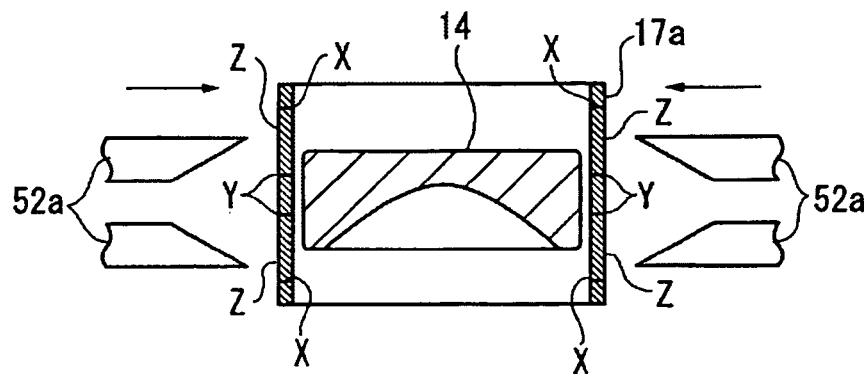
FIGS. 9(A) and (B) are schematics showing a procedure of thermal caulking according to the second exemplary embodiment of the present invention.
Figure 9:
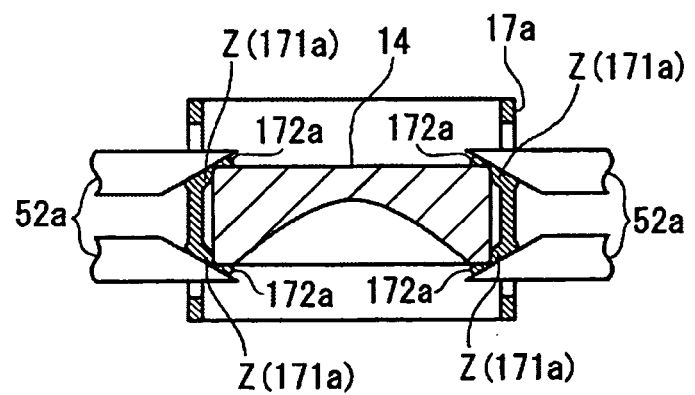

A method of fixing the collimator lens 14 with respect to the aforementioned lens fixing member 17a by thermal caulking will be described based on the diagram shown in FIG. 9.

FIG. 9(A) is a diagram showing the lens fixing member 17a and the collimator lens 14 before performing thermal caulking, and the collimator lens 14 is fitted in the lens fixing member 17a. On the left and right sides of the lens fixing member 17a, there is provided the thermal caulking devices 52a having a pointed extremities (only the portion which presses the thermally caulked portions 171a of the lens fixing member 17a is shown).

FIG. 9(B) is a diagram showing the state of thermal caulking. When the collimator lens 14 is positioned, the thermal caulking devices 52a in the heated state provided on the left and right sides of the lens fixing member 17a move toward the lens fixing member 17a from the left and the right as shown by arrows in FIG. 9(B), and heat and press the lens fixing member 17a from the direction of the side surface.

Then, the X portions shown in FIG. 7(B) are cut by heating and pressing operation of the thermal caulking devices 52a, and the Z portions (hatched portion) in the same drawing move inwardly of the lens fixing member 17a along the Y portions in the same drawing as the bending fulcrums and form the thermally caulked portions 171a. Then, the extremities of the thermally caulked portions 171a cover on the collimator lens 14 as the distal portions 172a, are thermally caulked so that the collimator lens 14 is positioned in and fixed to the lens fixing member 17a (FIG. 9(B)). Although the pins of the alignments are not shown in FIG. 9(A) and FIG. 9(B), the collimator lens 14 is retained at the adjusted position until the collimator lens 14 is fixed by thermal caulking with respect to the lens fixing member 17a.

According to the second exemplary embodiment described above, in addition to the effects as in the aforementioned (A), (B), (D)-(G), the following effects may be achieved.

(H) Since the position adjustment of the collimator lens 14 is performed not only in the direction perpendicular to the direction of the optical axis of the collimator lens 14, but also in the direction of the optical axis of the collimator lens 14, alignment between the optical axis V of the elliptic reflector 12 and the optical axis W of the collimator lens 14 is addressed or achieved with higher degree of accuracy, and the convergent light emitted from the elliptic reflector 12 can be guided to the collimator lens 14 reliably. Therefore, the luminous flux emitted from the light source lamp 11 can be emitted from the light source lamp unit 10a further efficiently, and the illumination intensity of the luminous flux emitted from the light source lamp unit 10a can be enhanced or improved.

Third Exemplary Embodiment

The third exemplary embodiment of the present invention will be described. As in the description of the second exemplary embodiment, parts which are similar to the parts or the members which have been already described are represented by the same reference numerals and descriptions thereof are omitted.

In the first exemplary embodiment and the second exemplary embodiment, a mode in which the collimator lens 14 is fixed to the lens fixing members 17, 17a by thermal caulking is shown.

Figure 10:
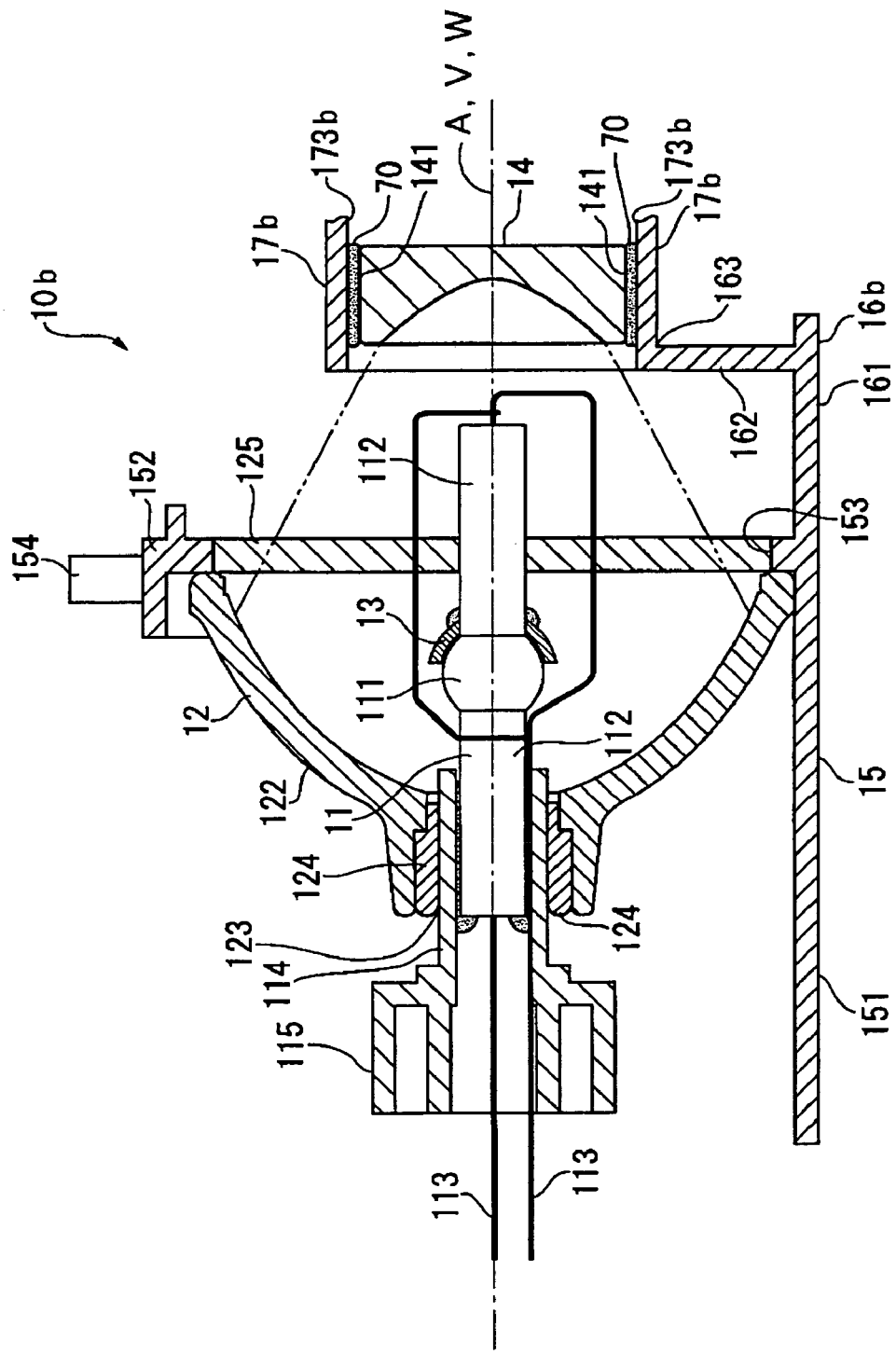
FIG. 10 is a schematic cross-sectional view showing the structure of the light source unit according to a third exemplary embodiment of the present invention.

In contrast, as shown in FIG. 10, a light source lamp unit 10b according to the third exemplary embodiment is different in that a side surface 141 of the collimator lens 14 is fixed to an inner surface 173b of a lens fixing member 17b with an adhesive agent.

In the present exemplary embodiment, the lens fixing member 17b of a lens positioning member 16b and the lamp housing 15 are integrally formed.

In the present exemplary embodiment, the adhesive agent is present between the side surface 141 of the collimator lens 14 and the inner surface 173b of the lens fixing member 17b to form an adhered portion 70, and the collimator lens 14 and the lens fixing member 17 are integrally secured when the adhesive agent is cured.

Although the adhesive agent and adhering method used are not limited, for example, the adhering method such that preliminary fixation is made by the use of the silicone heat-resistant UV cure adhesive whereof the melting point is 150° C.-200° C. as needed, and then permanent fixation is made using silicone or epoxy heat resistant adhesive agent whereof the melting point is 250° C.-350° C.

Figure 11:
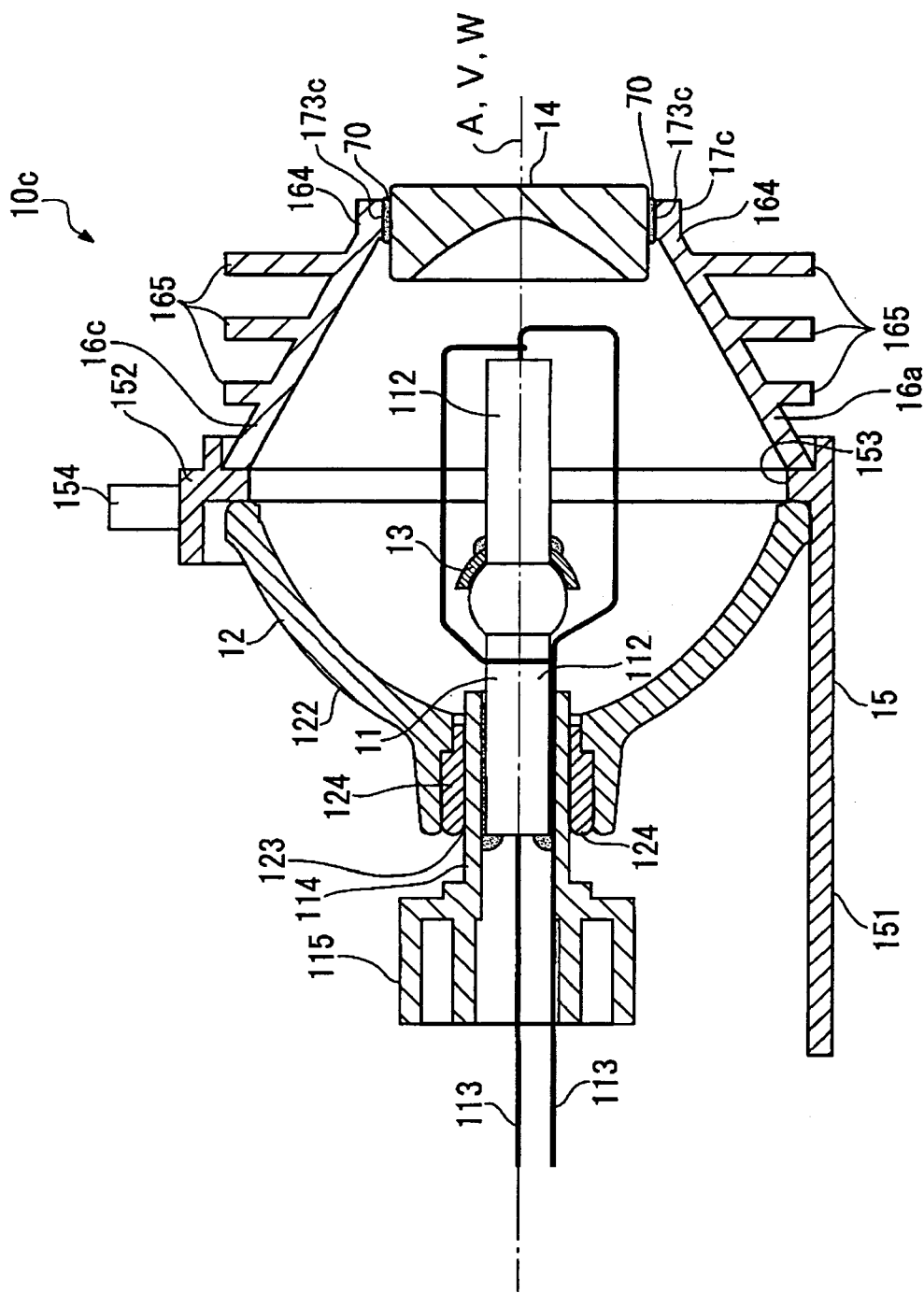
FIG. 11 is a schematic cross-sectional view showing the structure of the light source unit according to the third exemplary embodiment of the present invention in a modified state.

FIG. 11 shows a mode in which a lens positioning member 16c, which is a covering member having a heat conductivity, is employed instead of the lens positioning member 16b of the aforementioned light source lamp unit 10b shown in FIG. 10.

As shown in FIG. 11, the lens positioning member 16c includes a heat absorbing portion 164 formed of a substantially conical cylindrical member to be mounted to the opening 153 of the perpendicular portion 152 of the lamp housing 15, a plurality of heat discharging fins 165 projecting from the outside of the heat absorbing portion 164, and a lens fixing member 17c formed at the distal end of the heat absorbing portion 164, and is formed as a metallic single piece member.

The heat absorbing portion 164 is a member for absorbing radiant heat radiated from the light source lamp 11, and heat of air circulating in the sealed space in the elliptic reflector 12 and the lens positioning member 16c, and the inner surface thereof is finished with black alumite. The inclined surface of the substantially conical heat absorbing portion 164 extends in parallel with the inclination of the convergent light from the elliptic reflector 12, so that the luminous flux emitted from the elliptic reflector 12 does not come into contact with the inner surface of the heat absorbing portion 164 as much as possible.

The plurality of heat discharging fins 165 are formed as plate members extending in the direction perpendicular to the optical axis of a light source lamp unit 10c, and gaps for allowing sufficient cooling air to pass are formed between the respective adjacent heat discharging fins 165.

After the collimator lens 14 is finely moved and positioned in the direction perpendicular to the direction of the optical axis of the collimator lens 14 and in the direction of the optical axis with respect to the lens fixing member 17c as in the case of the light source lamp unit 10b shown in FIG. 10 described above, since the adhered portion 70 formed of the adhesive agent is formed between the side surface 141 of the collimator lens 14 and an inner surface 173c of the lens fixing member 17c, the collimator lens 14 and the lens fixing member 17c are fixedly integrated. In this manner, by securing the collimator lens 14 with respect to the lens positioning member 16c mounted to the opening 153 of the perpendicular portion 152 of the lamp housing 15, the light source lamp unit 10c has no opening, and hence an explosion proof structure for reducing or preventing fragments of the light source lamp 11 from flying out in all direction when the light source lamp 11 is exploded may be formed.

Cooling operation of the light source lamp unit 10c will be described. In the first place, the power source of the projector 1 is turned on, and the light source lamp 11 is illuminated. Then white light is emitted, and simultaneously infrared ray and radiant heat are radiated from the light source lamp 11. In this case, the cooling fan in the projector 1 is activated to start cooling of the heat discharging fin 165.

The infrared ray radiated toward the front of the light source lamp 11 passes through the secondary reflecting mirror 13 and is absorbed by the heat absorbing portion 164 of the lens positioning member 16c. Air heated by the radiant heat circulates therein, and heated air exchange heat with the inner surface of the heat absorbing portion 164 of the lens positioning member 16c, whereby heat is absorbed and cooled. Heat absorbed by the heat absorbing portion 164 is conducted to the heat discharging fins 165, and heat is exchanged with cooling air from the cooling fan to cool the heat discharging fins 165.

In the light source lamp unit 10b shown in FIG. 10 and the light source lamp unit 10c shown in FIG. 11, a fixing device provided with an adhesive agent injector instead of the thermal caulking device 52a of the fixing device 60 shown in FIG. 8 may be employed as the fixing device for fixing the collimator lens 14 with respect to the lens positioning member 16b provided with the lens fixing member 17b or the lens positioning member 16c provided with the lens fixing member 17c.

A method of manufacturing the light source lamp unit 10b or 10c including a method of fixing the collimator lens 14 with respect to the lens positioning member 16b provided with the lens fixing member 17b or the lens positioning member 16c provide with the lens fixing member 17c using the fixing device as described above will be described below.

(3-1) As in the process (2-1) to (2-4) of the method of fixing the collimator lens 14 to the lens positioning member 16a in the second exemplary embodiment described above, fix the elliptic reflector 12 fixedly positioned to the light source lamp 11 together with the secondary reflecting mirror 13 to the lamp housing 15, dispose the lens positioning member 16b provided in the lamp housing 15 on the retaining table, retaining the collimator lens 14 in the lens fixing member 17b or 17c, convert distribution of the illumination intensity of the luminous flux parallelized by the collimator lens 14 into image data by way of the luminous flux detecting device 53, and slightly move and position the collimator lens 14 with respect to the lens fixing member 17b or 17c in the direction perpendicular to the direction of the optical axis of the collimator lens 14 and in the direction of the optical axis according to information of image data.

(3-2) Form the adhered portion 70 by injecting and curing the adhesive agent between the side surface 141 of the collimator lens 14 and the inner surface 173b of the lens fixing member 17b or the inner surface 173c of the lens fixing member 17c, and integrally secure the collimator lens 14 and the lens fixing member 17b or 17c.

Injection for the adhesive agent as described above may be various methods such as injecting the adhesive agent from an infusion hole formed on the lens fixing member 17b or 17c, or inserting an injection tube between the inner surface 173b of the lens fixing member 17b or 17c and the side surface 141 of the collimator lens 14 and injecting the adhesive agent therein.

According to the third exemplary embodiment described above, in addition to the effects as in (A), (E)-(H) described above, the following effects may be reduced or achieved.

(I) By fixing the lens fixing member 17b or 17c to the side surface 141 of the collimator lens 14 with the adhesive agent, generation of a gap between the inner surface 173b of the lens fixing member 17b or the inner peripheral surface 173c of the lens fixing member 17c and the side surface 141 of the collimator lens 14 or backlash of the collimator lens 14 with respect to the lens fixing member 17b or 17c may be reduced or prevented, and consequently, displacement of the axis of the collimator lens 14 can hardly occur, whereby fixation of the lens 14 is addressed or achieved with high degree of accuracy. Accordingly, lowering of the illumination intensity of the light source lamp unit 10b or 10c may be reduced or prevented.

(J) Since fixation of the collimator lens 14 is addressed or achieved by simple operations of injecting the adhesive agent and curing the injected adhesive agent, the number of required components is small, and hence complication of the shapes of the corresponding components may be avoided and the collimator lens 14 can be simply fixed, the manufacturing facility and the manufacturing process may be simplified, whereby good workability is addressed or achieved.

(K) Since the present exemplary embodiment may be implemented even in the case where the lens fixing member 17b or 17c is formed of materials such as metallic material or ceramics to which thermal caulking described in the aforementioned exemplary embodiment cannot be applied, it is optimal as means to be employed in the case in which the lens fixing member 17b or 17c are formed by such materials.

(L) Since the light source lamp unit 10c is provided with the lens positioning member 16c formed of metal which has good heat conductivity, radiant heat generated at the light source lamp 11 can be absorbed by the heat absorbing portion 164 and discharged through the heat discharging fins 165, and hence it is not necessary to form opening for introducing cooling air as in the relate art on the elliptic reflector.

Fourth Exemplary Embodiment

A fourth exemplary embodiment of the present invention will be described. As in the second exemplary embodiment and the third exemplary embodiment, parts which are similar to the parts or the members which have been already described are represented by the same reference numerals and descriptions thereof are omitted.

In the aforementioned third exemplary embodiment, the collimator lens 14 adhered and fixed to the lens fixing member 17b or the lens fixing member 17c with the adhesive agent is substantially cylindrical and a specific member is not formed on the outer periphery thereof.

Figure 12:
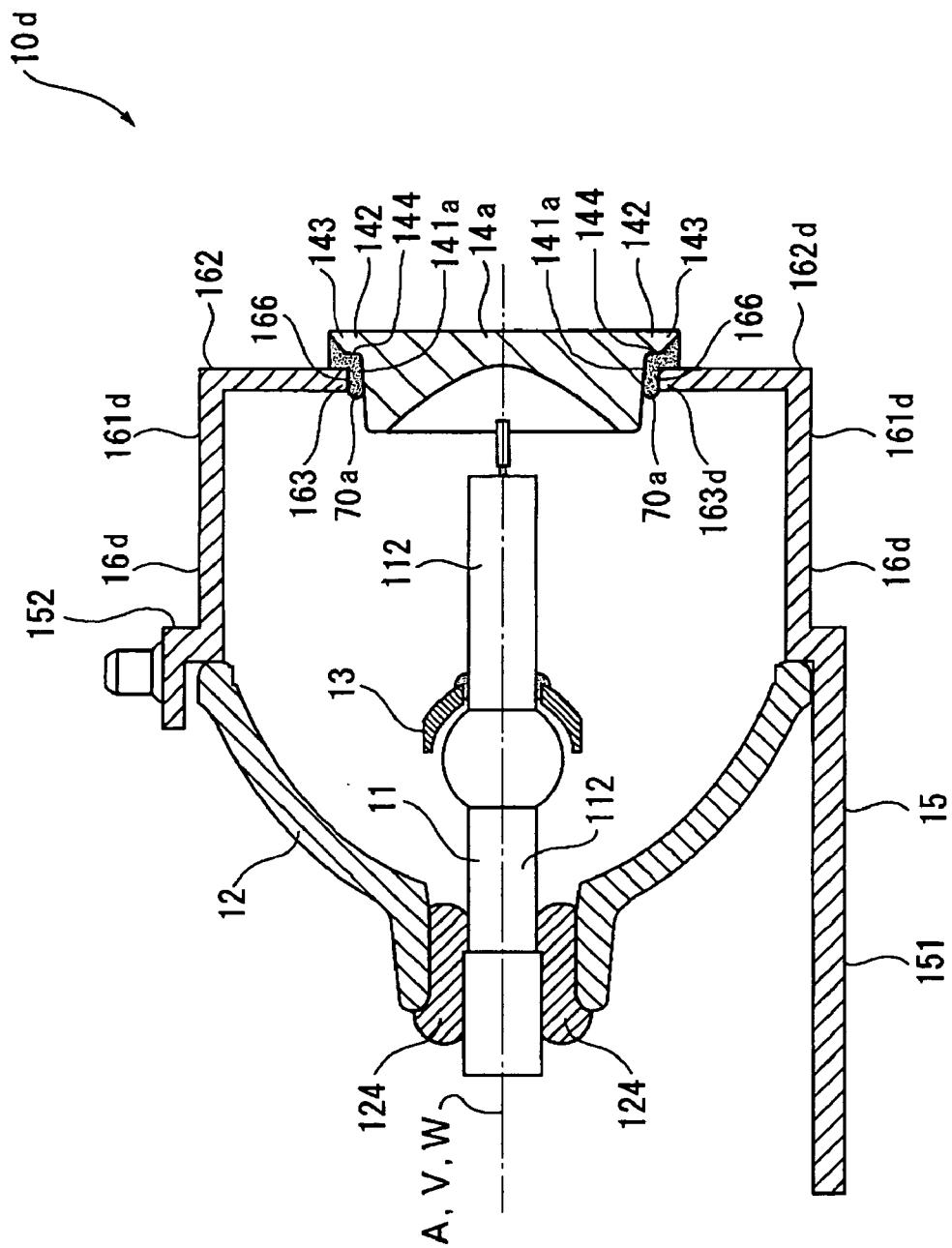
FIG. 12 is a schematic cross-sectional view showing the structure of the light source unit according to a fourth exemplary embodiment of the present invention.

In contrast, although a collimator lens 14a according to the fourth exemplary embodiment commonly has a substantially cylindrical shape, it is different in that a flange 142 is formed on the outer periphery, as shown in FIG. 12.

FIG. 12 shows a schematic cross-sectional view of a light source lamp unit 10d provided with the collimator lens 14a according to the present exemplary embodiment. In the light source lamp unit 10d according to the present exemplary embodiment shown in FIG. 12, a lens positioning member 16d includes a cylindrical side surface 161d of substantially column shape extending from the opening 143 of the perpendicular portion 152 of the lamp housing 15, and a perpendicular portion 162d formed perpendicularly to the substantially distally end of the side surface 161d, and is configured to fix the collimator lens 14a by a lens fixing member 163d at the distal end of the perpendicular portion 162d. The lens positioning member 16d is provided so as to cover the light source lamp 11 (arc tube). Since the collimator lens 14a is positioned and fixed to the distal end 163b of the lens positioning member 16b with the adhesive agent, the light source lamp unit 10d has no opening and hence an explosion proof structure for reducing or preventing fragments of the light source lamp 11 from flying out in all direction when the light source lamp 11 is exploded, may be formed.

Figure 13A:
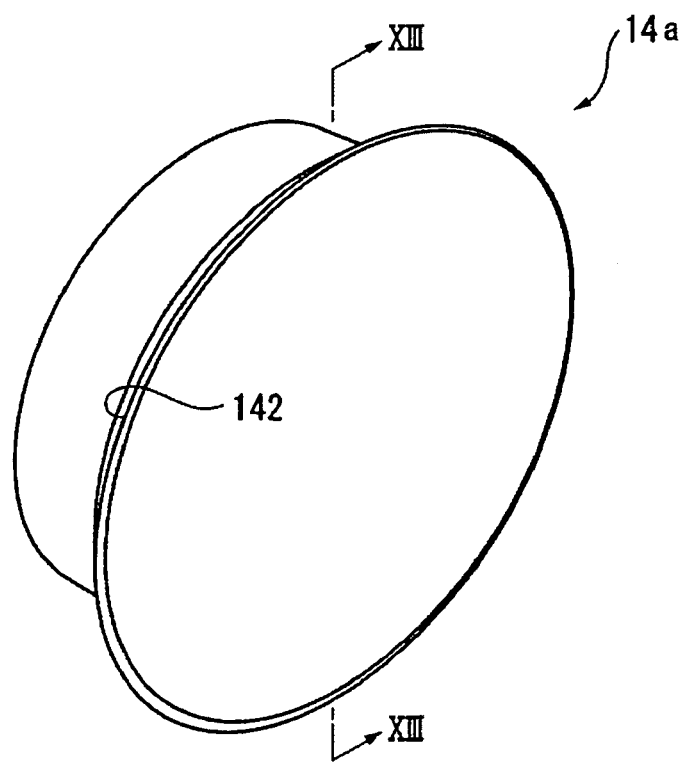
FIGS. 13(A) and (B) are schematics showing a collimator lens which constitutes the light source unit according to the fourth exemplary embodiment of the present invention ((A) is a schematic perspective view and (B) is a schematic cross-sectional view taken along the line XIII-XIII)
Figure 13B:
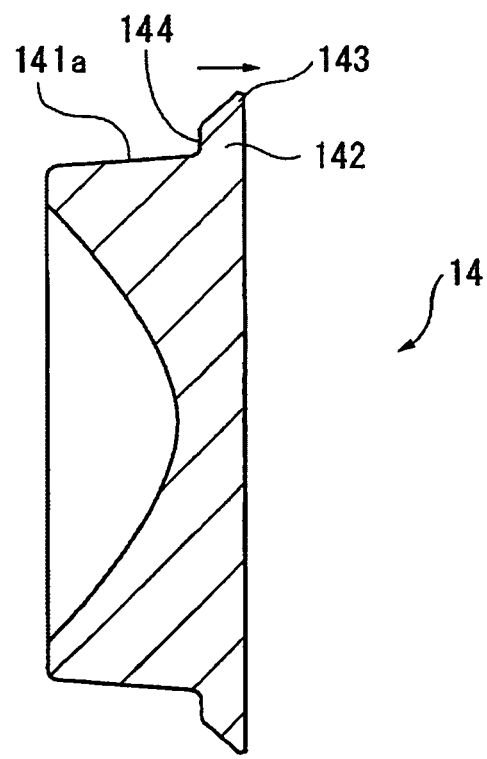

FIG. 13 is a schematic that shows the shape of the collimator lens 14a according to the present exemplary embodiment, and FIG. 13(A) is a perspective view of the collimator lens 14a, FIG. 13(B) is a schematic cross-sectional view taken along the line XIII-XIII. The flange 142 formed on the outer periphery of the collimator lens 14a is overhanging outwardly of the collimator lens 14a like a rib in the present exemplary embodiment. A distal end 143 of the flange 142 is chamfered, and is formed with an inclined surface so that the outer side (the side indicated by an arrow in FIG. 13(B)) is pointed.

As shown in FIG. 12, fixation of the collimator lens 14a to the lens fixing member 163d of the lens positioning member 16d is such that the adhesive agent is present between an inner surface 166 of the lens fixing member 163d of the lens positioning member 16d and the side surface 141a of the collimator lens 14a, and is also present between an inner surface 144 (on the side of the lens positioning member 16d) of the flange 142 formed on the outer periphery of the collimator lens 14a and the outside of the perpendicular portion 162d of the lens positioning member 16d, so that the injected adhesive agent forms a series of adhered portion 70a.

Then, in the light source lamp unit 10d, a fixing device having an adhesive agent injector may be employed as a fixing device for adhering and fixing the collimator lens 14a formed with the flange 142 on the outer periphery thereof to the lens fixing member 163d provided in the lens positioning member 16d instead of the thermal caulking device 52a of the fixing device 60 shown in FIG. 8.

In the present exemplary embodiment, it is also possible to manufacture the light source lamp unit 10d (light source unit 10d) by utilizing the flange 142 formed on the outer periphery of the collimator lens 14a and using a fixing jig 90 which can grip the collimator lens 14 instead of the pins of the alignments in the fixing device 60 shown in FIG. 8 to fix the collimator lens 14a to the lens fixing member 163d of the lens positioning member 16d.

Figure 14:
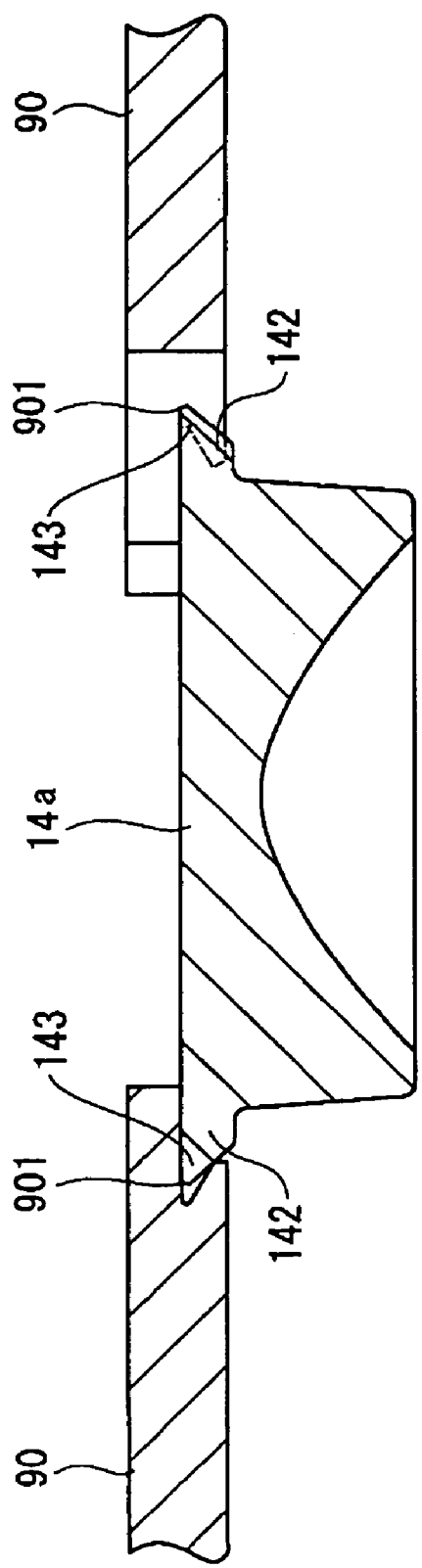
FIG. 14 is a schematic cross-sectional view showing a state in which the collimator lens is mounted to a fixing jig according to the fourth exemplary embodiment of the present invention.

FIG. 14 is a schematic cross-sectional view showing a state in which the collimator lens 14a is mounted to a fixing jig 90 which can grip the collimator lens 14 in the fixing device of the present exemplary embodiment.

The fixing jig 90 which can grip the collimator lens 14a in the fixing device of the present exemplary embodiment is formed of a plate shaped member, and is formed with a claw 901 at the distal end thereof to which the distal end 143 of the flange 142 of the collimator lens 14a is inserted for mounting the collimator lens 14a.

The claw 901 in the fixing device of the present exemplary embodiment is formed with a notch of an acute angle at the distal end of the fixing jig 90. As shown in FIG. 17, the fixing jig 90 is to be mounted to the collimator lens 14a from the left and right sides, and the collimator lens 14a is supported at one position on one side (lower side in FIG. 14), and at two positions on the other side (upper side in FIG. 14).

The distal end 143 of the flange 142 of the collimator lens 14a is inserted into the claw 901 of the fixing jig 90, and the angle at the distal end 143 of the flange 142 of the collimator lens 14a to be mounted to the fixing jig 90 is preferably an acute angle between 30° and 90°. In addition, more preferably, the angle of the distal end 143 of the flange 142 is between 30° and 60°.

Figure 15:
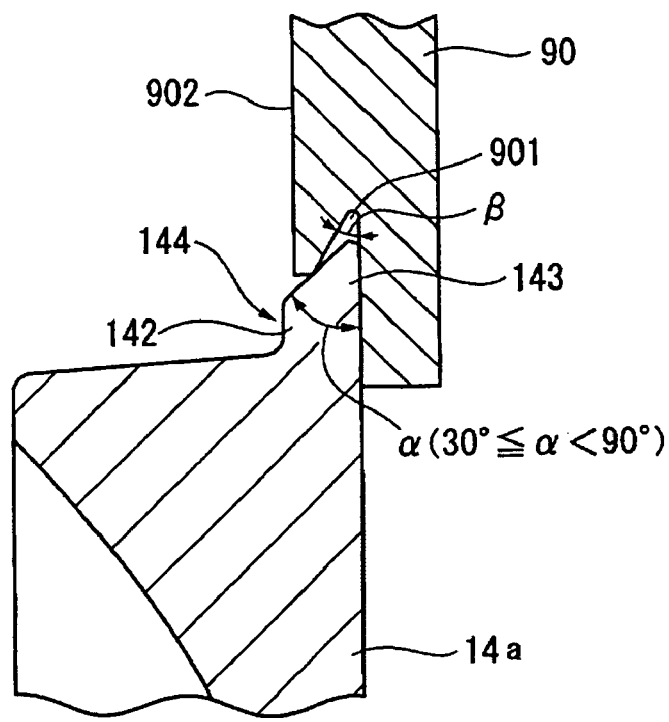
FIG. 15 is a schematic perspective view showing a relation between a claw formed on the fixing jig and the angle of the extremity of a flange of the collimator lens according to the fourth exemplary embodiment of the present invention.
Figure 16:
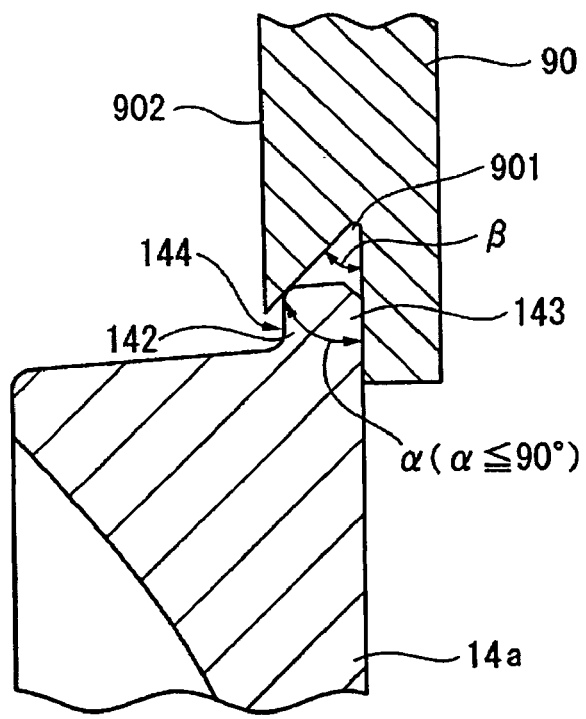
FIG. 16 is a schematic showing the state of the fixing jig compared with the extremity of the claw formed on the fixing jig according to the fourth exemplary embodiment of the present invention.

FIG. 15 is a schematic that shows a relation between the claw 901 formed on the fixing jig 90 and the angle of the distal end 143 of the flange 142 of the collimator lens 14a. As shown in FIG. 15, the angle $\alpha$ at the distal end 143 of the flange 142 of the collimator lens 14a is an acute angle between 30° and 90° (more preferably between 30° and 60°), and hence the angle $\beta$ of the notch of the claw 901 formed on the fixing jig 90 may be formed into an angle smaller than the angle $\beta$, so that an inner surface 902 of the fixing jig 90 does not protrude from the inner surface 144 of the flange 142. For example, as shown in FIG. 16, when the angle $\beta$ of the distal end 143 of the flange 142 of the collimator lens 14a is a right angle or larger, the angle $\beta$ of the notch of the claw 901 formed on the fixing jig 90 increases correspondingly, and hence the inner surface 902 of the fixing jig 90 protrudes from the inner surface 144 of the flange 142.

Subsequently, a method of fixing the collimator lens 14a to the lens positioning member 16d provided with the lens fixing member 163d using the aforementioned fixing device will be described.

Firstly, a method of manufacturing the light source lamp unit 10d including a method of fixing the collimator lens 14a to the lens positioning member 16d using the fixing device provided with pins at the distal end of the alignments as in the aforementioned exemplary embodiment but not provided with the fixing jig 90 will be described.

(4-1) As in the steps from (3-1) to (3-2) in a method of fixing the collimator lens 14 to the lens positioning member 16b according to the aforementioned third exemplary embodiment, dispose the light source lamp 11, the secondary reflecting mirror 13, the elliptic reflector 12, the lamp housing 15, and the lens positioning member 16d on the retaining table, fit the collimator lens 14a to the lens fixing member 163d of the lens positioning member 16d, convert distribution of the illumination intensity of the luminous flux parallelized by the collimator lens 14a into image data by the luminous flux detecting device 53 as in the steps in (2-3)-(2-4) in a method of fixing the collimator lens 14 to the lens positioning member 16a in the aforementioned second exemplary embodiment, slightly move the collimator lens 14a in the direction perpendicular to the direction of the optical axis of the collimator lens 14a and in the direction of the optical axis with respect to the lens fixing member 163d according to information of image data to adjust the position thereof, form the adhered portion 70*a* by injecting and adhesive agent between the inner surface 166 of the lens fixing member 163*d* of the lens positioning member 16*d* and the side surface 141*a* of the collimator lens 14*a* and between the inner surface 144 of the flange 142 formed on the outer periphery of the collimator lens 14*a* and the outside of the perpendicular portion 162*d* of the lens positioning member 16*d* and curing the same so that the collimator lens 14 and the lens fixing member 17 are securely integrated.

In this case, as in the case of the third exemplary embodiment described above, various methods, such as injecting the adhesive agent through the infusion hole, not shown, formed on the lens positioning member 16*d*, or inserting the injection tube between the inner surface 166 of the lens fixing member 163*d* of the lens positioning member 16*d* and the side surface 141*a* of the collimator lens 14*a* and between the inner surface 144 of the flange 142 formed on the collimator lens 14*a* and the outer surface of the lens positioning member 16*d* and injecting the adhesive agent therein, can be used.

Subsequently, a method of manufacturing the light source lamp unit 10*d* including a method of fixing the collimator lens 14*a* to the lens fixing member 163*d* provided in the lens positioning member 16*d* using the fixing device provided with a fixing jig 90 will be described below.

(5-1) As in the step (2-1) in the method of fixing the collimator lens 14 to the lens positioning member 16*a* of the aforementioned second exemplary embodiment, fix the elliptic reflector 12 positioned and fixed to the light source lamp 11 with the secondary reflecting mirror 13 to the lamp housing 15 and dispose the lens positioning member 16*d* provided on the lamp housing 15 to the retaining table.

(5-2) Insert the distal end 143 of the flange 142 of the collimator lens 14*a* into the gap of the notch on the claw 901 of the fixing jig 90 which can grip the collimator lens 14*a* to mount the collimator lens 14*a* to the fixing jig 90 (FIG. 17(A)).

Figure 18:
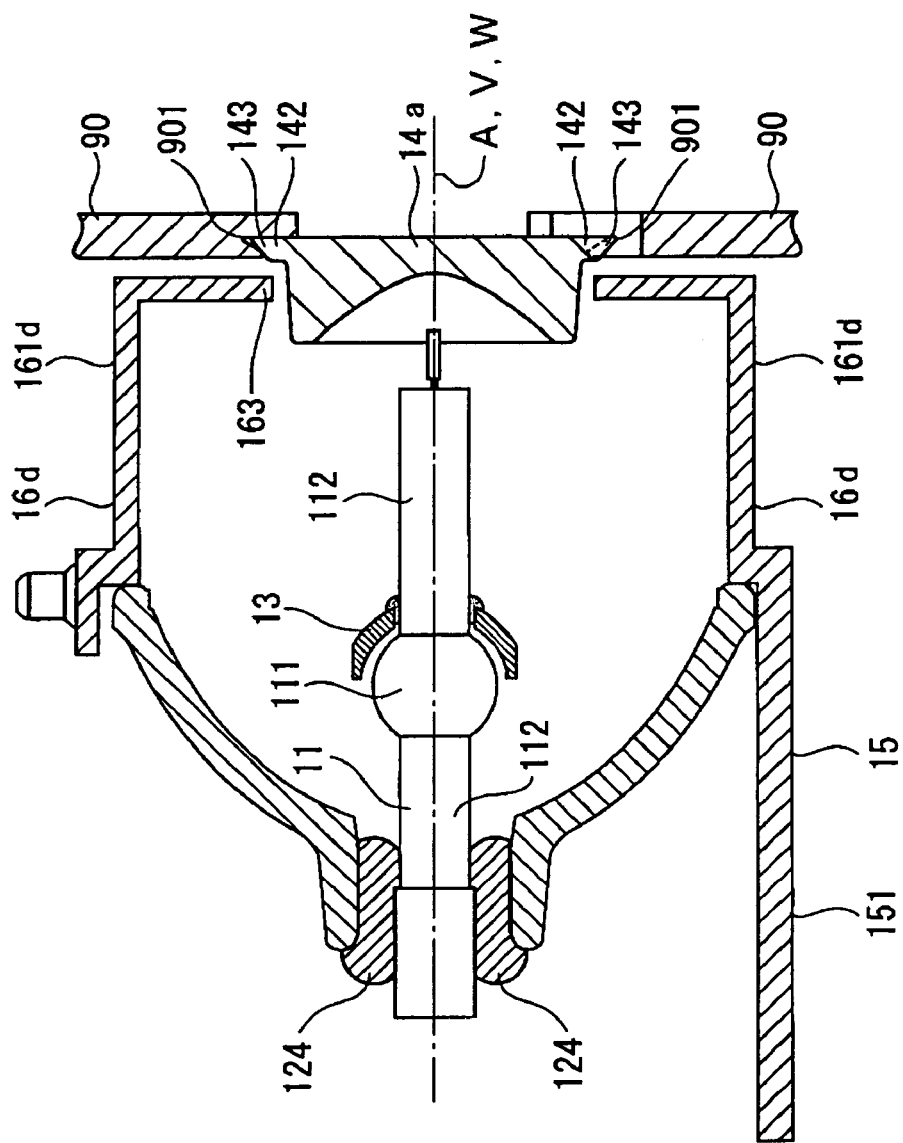
FIG. 18 is a schematic cross-sectional view showing a state in which the collimator lens mounted to the fixing jig is fitted to the lens fixing member according to the fourth exemplary embodiment of the present invention.

(5-3) When the collimator lens 14*a* is mounted to the fixing jig 90 as shown in FIG. 17(A), fit the collimator lens 14*a* being mounted to the fixing jig 90 to the distal end 163*b* of the lens positioning member 16*b* as shown in FIG. 18.

(5-4) As in the steps from (2-3) to (2-4) in the method of fixing the collimator lens 14 to the lens positioning member 16*d* in the aforementioned second exemplary embodiment, convert distribution of illumination intensity of the luminous flux parallelized by the collimator lens 14*a* into image data by the luminous flux detecting device 53, move the fixing jig 90 on which the collimator lens 14*a* is mounted, and slightly move the collimator lens in the direction perpendicular to the direction of the optical axis of the collimator lens 14*a* and in the direction of the optical axis to adjust the position thereof with respect to the lens fixing member 163.

(5-5) When the position of the collimator lens 14*a* with respect to the lens fixing member 163*d* is adjusted, form the adhered portion 70*a* by injecting or applying the adhesive agent between the collimator lens 14 and the lens positioning member 16 and curing the same to fixedly adhere the collimator lens 14*a* to the lens positioning member 16*d*. In this case, injection of the adhesive agent is performed in the following two steps. The adhered portion 70*a* is formed by injecting or applying, and then curing the adhesive agent between the side surface 141*a* of the collimator lens 14*a* and the inner surface 166 of the lens fixing member 163*d* of the lens positioning member 16*d* and between the inner surface 144 of the flange 142 formed on the outer surface of the collimator lens 14*a* and the outer periphery of the perpendicular portion 162*d* of the lens positioning member 16*d* to fixedly integrate the collimator lens 14*a* and the lens positioning member 16*d*.

(5-5-1) Leave the fixing jig 90 on the collimator lens 14*a* even when the position of the collimator lens 14*a* with respect to the lens fixing member 163*d* is adjusted, and inject or apply the adhesive agent such as thermoset adhesive agent to the portion of the flange 142 other than those covered by the claw 901 of the fixing jig 90. Accordingly, the adhesive agent is injected or applied between the side surface 141*a* of the collimator lens 14*a* and the inner surface 166 of the lens fixing member 163*d* of the lens positioning member 16*d* and the portion of the outer periphery of the collimator lens 14*a* which is not covered by the claw 901 of the fixing jig 90, and hence part of the adhered portion 70*a* (hatched portion in FIG. 17(B)) is formed.

(5-5-2) When the adhesive agent injected in the step of (5-5-1) is cured, remove the fixing jig 90 from the collimator lens 14*a* and inject or apply the adhesive agent such as thermo set adhesive agent or cold setting adhesive agent to the remaining outer periphery of the collimator lens 14*a* on which the adhesive agent is not applied and cure the same to form the adhered portion 70*a*. Accordingly, the adhered portion 70*a* (hatched portion in FIG. 17(C)) is formed around the entire outer peripheral surface of the collimator lens 14*a* (FIG. 17(C)).

In addition to the effects as in the aforementioned (A), (E)-(H), according to the fourth exemplary embodiment as described above, the following effects are achieved.

(M) Since the position of the collimator lens 14*a* can be set so that the optimal distribution of the illumination intensity of the luminous flux parallelized by the collimator lens 14, which is picked up by the CCD camera of the luminous flux detecting device 53, is obtained by moving the collimator lens 14*a* fixedly retained by the fixing jig 90 in the direction perpendicular to the direction of the optical axis and in the direction of the optical axis because the collimator lens 14*a* is mounted to the fixing jig 90, the position of the collimator lens 14*a* can be adjusted with high degree of accuracy. Therefore, the luminous flux emitted from the light source lamp 11 can be emitted further efficiently from the light source lamp unit 10*d*.

(N) Since the rib shaped flange 142 is formed on the outer periphery of the collimator lens 14*a*, the adhesive agent can be injected or applied easily around the entire outer peripheral surface of the collimator lens 14*a* when the collimator lens 14*a* is fixed to the lens positioning member 16*d* with the adhesive agent.

(O) Since the entire outer peripheral surface of the collimator lens 14*a* is adhered and fixed to the lens positioning member 16*d*, the collimator lens 14*a* is fixed to the lens positioning member 16*d* with the adhered portion 70*a* formed entirely over the outer peripheral surface of the collimator lens 14*a* easily and reliably. Therefore, the explosion proof structure can be realized without increasing the number of components uselessly, and explosion proof measure such that fragments of the arc tube are reduced or prevented from flying out in all direction even when it is exploded is ensured.

(P) Since the angle at the distal end of the flange 142 formed on the outer periphery of the collimator lens 14*a* is an acute angle between 30° and 90°, the claw 901 formed on the fixing jig 90 is reduced or prevented from protruding from the inner surface of the flange 142 when mounting the collimator lens 14 to the fixing jig 90.

Accordingly, even when the collimator lens 14 is positioned by being fitted to the distal end 163*b* of the lens positioning member 16b with the collimator lens 14a mounted to the fixing jig 90 and the adhesive agent is injected or applied, the inner surface 902 of the fixing jig 90 does not come into contact with the lens fixing member 163d or the perpendicular portion 162d of the lens positioning member 16d, and hence the thickness of the adhered portion 70a formed by the adhesive agent between the inner surface 144 of the flange 142 and outside of the perpendicular portion 162d of the lens positioning member 16d may be decreased, whereby displacement of the collimator lens 14 due to curing and contraction of the adhesive agent may be reduced or prevented. Consequently, lowering of the illumination intensity of illumination from the light source lamp unit 10d may be reduced or prevented.

(Q) Since the collimator lens 14a is positioned with respect to the lens fixing member 163d of the lens positioning member 16d provided in the lamp housing 15 with the collimator lens 14a mounted to the fixing jig 90 when manufacturing the light source lamp unit 10d as the light source unit, the collimator lens 14a can be adjusted easily, only a small number of components are required, the shapes of the components are not complicated, and the collimator lens 14a can be fixed with the simple means. Therefore, the manufacturing facility and the manufacturing steps may be simplified, whereby good workability is addressed or achieved. Also, the entire outer peripheral surface of the collimator lens 14a can be adhered and fixed to the lens positioning member 16d easily and reliably, and hence the explosion proof structure is addressed or achieved further preferably.

Fifth Exemplary Embodiment

A fifth exemplary embodiment of the invention will be described. As in the description of the aforementioned exemplary embodiments, parts which are similar to the parts or the members which have been already described are represented by the same reference numerals and descriptions thereof are omitted.

In the fixing device of the aforementioned exemplary embodiment, distribution of the illumination intensity of the luminous flux parallelized by the collimator lens 14 or 14a is converted into image data by the luminous flux detecting device 53 provided with the CCD camera, and based on the image data information, the position of the collimator lens 14 or 14a with respect to the lens positioning member 16-16d is figured out.

In contrast, the fixing device according to the fifth exemplary embodiment is different from the fixing device in the aforementioned exemplary embodiments in that a luminous flux detecting device 55 is provided with an integrating sphere 55a for measuring the illumination intensity of the luminous flux parallelized by the collimator lens 14 or 14a is provided for figuring out the position of the collimator lens 14 or 14a with respect to the lens positioning member 16-16d.

Figure 19:
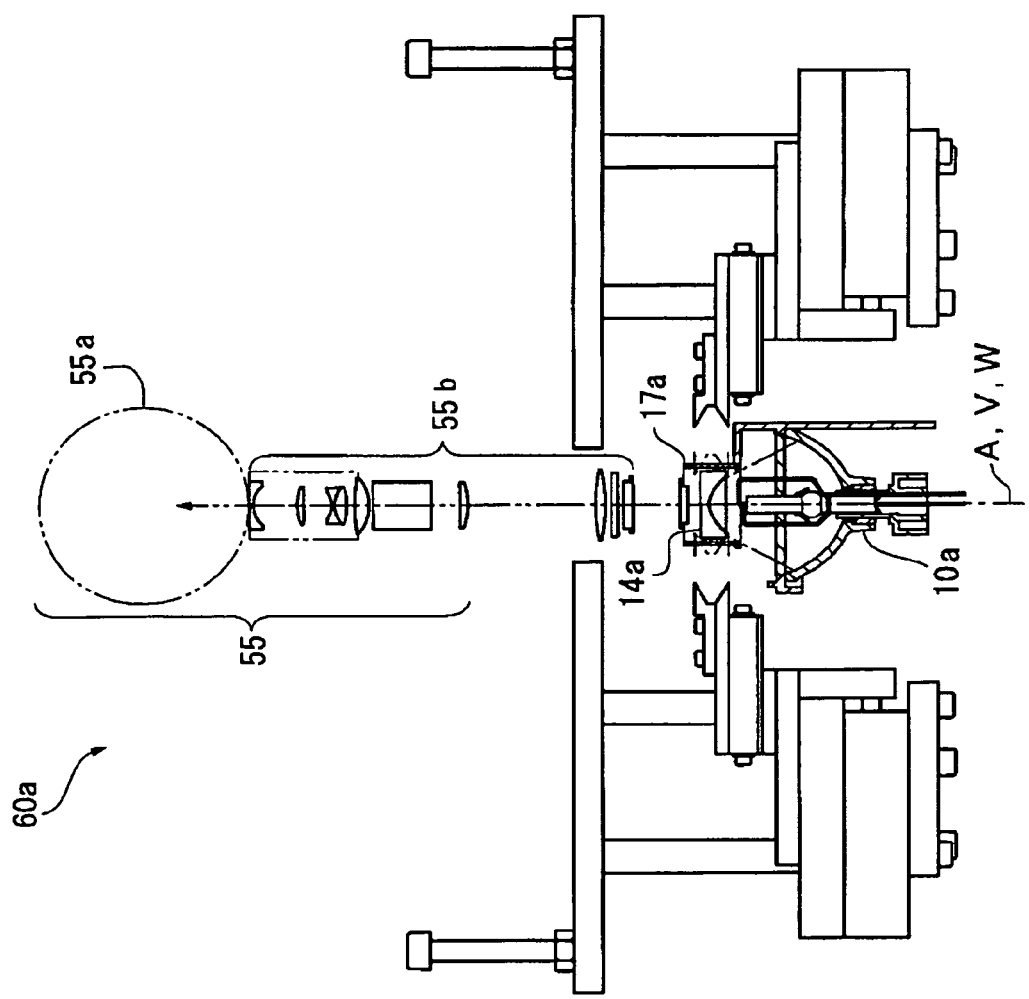
FIG. 19 is a schematic showing the fixing unit according to a fifth exemplary embodiment of the present invention.

A fixing device 60a shown in FIG. 19 includes the luminous flux detecting device 55 provided with the integrating sphere 55a instead of the CCD camera in the luminous flux detecting device 53 in the fixing device 60 according to the second exemplary embodiment shown in FIG. 8. The luminous flux detecting device 55 includes an optical system 55b disposed on the optical axis of the light source lamp unit 10a so that the luminous flux emitted from the light source lamp unit 10a disposed in the fixing device 60a is guided thereto, and the integrating sphere 55a to measure the illumination intensity of the luminous flux emitted from the optical system 55b. The optical system 55b includes the uniformly illuminating optical system 20, the field lens 41, and a frame member having an opening of the same shape as the illuminating area which is an object to illuminate of the light source lamp unit 10b, and may includes the projecting optical system 80. The integrating sphere 55a is disposed so that the luminous flux emitted from the opening of the frame member of the optical system 55b is guided thereto.

In order to fix the collimator lens 14 with respect to the lens positioning member 16a having the lens fixing member 17a of the light source lamp unit 10a according to the second exemplary embodiment using the fixing device 60a shown in FIG. 19, for example, in the method of fixing the collimator lens 14 to the lens positioning member 16a using the fixing device 60 shown in FIG. 8 described above, the collimator lens 14 may be positioned with respect to the lens positioning member 16a so that the optimal illumination intensity of the luminous flux emitted from the light source lamp unit 10b is addressed or achieved. That is, by measuring the illumination intensity in the illuminating area, which is an object to be illuminated by the light source lamp unit 10a, by the integrating sphere 55a of the luminous flux detecting device 55 and determining the state of displacement of the optical axis W of the collimator lens 14 with respect to the optical axis V of the elliptic reflector 12 based on the obtained measurement information instead of picking up distribution of the illumination intensity of the luminous flux parallelized by the collimator lens 14 using the CCD camera of the luminous flux detecting device 53 and converting it into image data the optimal illumination is addressed or achieved.

In other exemplary embodiments as well, by replacing the luminous flux detecting device 53 and the luminous flux detecting device 55 as needed, the light source lamp unit using the structure of the fixing device of the present exemplary embodiment and the fixing device of the present exemplary embodiment may be manufactured.

In addition to the effects as in the aforementioned exemplary embodiments, according to the fifth exemplary embodiment as described above, the following effects may be achieved.

(R) Since the position of the collimator lens with respect to the lens fixing member of the lens positioning member is adjusted so that the optimal illumination intensity in the illuminating area of the luminous flux emitted from the light source lamp unit is addressed or achieved by measuring the illumination intensity in the illuminating area which is an object to be illuminated by the light source lamp unit by the luminous flux detecting device 55, the light source lamp unit which illuminates the illuminating area with the luminous flux of optimal intensity may be manufactured.

The present invention is not limited to the aforementioned exemplary embodiments, and the following exemplary modifications are also included.

For example, in the aforementioned exemplary embodiments, a high-pressure mercury lamp with mercury encapsulated within the light emitting section 111 is employed as the light source lamp 11, it is not limited thereto, and various arc tubes emitting light of high brightness may be employed. For example, metal halide lamp, or a high-pressure mercury lamp may be employed in exemplary embodiments of the present invention.

Also, for example, although exemplary embodiments of the present invention are applied to the light source lamp unit 10 having the secondary reflecting mirror 13 on the light source lamp 11, it is not limited thereto, and exemplary embodiments of the present invention may be applied to the light source unit provided with a light source lamp having no secondary reflecting mirror.

Also, for example, although the lamp housing 15 in the aforementioned exemplary embodiments is an integrated mold of synthetic resin, it is not limited thereto, and various materials such as metal or ceramics may be employed.

Also, for example, the lens positioning member 16-16*d* in the aforementioned exemplary embodiments may be formed using various materials such as synthetic resin, metal, or ceramics.

Although only the example of the projector 1 using the three liquid crystal panels 42R, 42G, 42B is shown in the aforementioned exemplary embodiment, the present invention may be applied to a projector using only one liquid crystal panel, a projector using two liquid crystal panels or a projector using four or more liquid crystal panels.

Although the translucent liquid crystal panel in which the light incident surface is different from that on the light emitting surface is used in the aforementioned exemplary embodiments, a liquid crystal panel of reflecting type in which the light incident surface and the light emitting surface are identical may be employed.

Although the light source lamp unit 10 as the light source unit of exemplary embodiments of the present invention is employed for the projector 1 provided with the liquid crystal panel 42R, 42G, 42B in the aforementioned exemplary embodiment, it is not limited thereto, and the light source unit according to exemplary embodiments of the present invention may be employed for a projector provided with a light modulation device using a micro mirror. In this case, the polarizing plates on the luminous flux incoming side and the luminous flux emitting side may be omitted.

Although only the example of the front-type projector which projects from the direction to view the screen is shown in the aforementioned exemplary embodiment, exemplary embodiments of the present invention may be applied to the rear-type projector which projects in the opposite direction from the direction to view the screen.

Although the light source lamp unit or the illumination optical unit of exemplary embodiments of the present invention is employed to the projector in the aforementioned exemplary embodiments, the present invention is not limited thereto, and the light source lamp unit or the illumination optical device according to exemplary embodiments of the present invention may be applied to other optical devices.

Other detailed structures and shapes for implementing exemplary embodiments of the present invention may be employed within the range in which the object of exemplary embodiments of the present invention may be addressed or achieved.

What is claimed is:

1. A projector comprising:
a light source unit;
a uniformly illuminating optical system to uniformly illuminate a illumination intensity on a surface of an illumination area from light emitted from the light source unit;
a optical device to modulate light from the uniformly illuminating optical system according to image information;
a projecting optical system to project light modulated by the optical device, and
an optical component enclosure having a preset reference axis, the uniformly illuminating optical system being positionally adjusted and stored in the optical component enclosure;
the light source unit, comprising:
an arc tube having a light emitting section, electrodes and sealed sections provided on both sides of the light emitting section, discharging emission being performed between the electrode sections;
an oval reflector having a reflecting surface of a substantially elliptical shape to emit a luminous flux radiated from the arc tube in a certain direction;
a collimator lens to make parallel convergent light from the elliptic reflector;
a lamp housing to set a direction of an optical axis of the elliptic reflector, the lamp housing including a lens positioning member in which the collimator lens is fixed, the collimator lens being positioned and fixed to the lamp housing by the lens positioning member in a state in which the optical axis of the elliptic reflector and an optical axis of the collimator lens are aligned.

2. The projector according to claim 1, the lens positioning member being formed integrally with the lamp housing.

3. The projector according to claim 1, the collimator lens being fixed to the lens positioning member by thermal caulking.

4. The projector according to claim 1, the collimator lens being fixed to the positioning member with an adhesive agent.

5. The projector according to claim 4, the collimator lens being formed with a flange on an outer periphery thereof.

6. The projector according to claim 4, an entire outer peripheral surface of the collimator lens being adhered and fixed to the lens positioning member.

7. The projector according to claim 5, an angle of an extremity of the flange formed around the outer periphery of the collimator lens being an acute angle between 30° and 90°.

* * * * *